(12) United States Patent
Newell et al.

(10) Patent No.: US 11,133,984 B2
(45) Date of Patent: Sep. 28, 2021

(54) INTERNET-OF-THINGS DEVICE AUTONOMOUS ACTIVATION

(71) Applicant: DISH Network L.L.C., Englewood, CO (US)

(72) Inventors: Nicholas Newell, Centennial, CO (US); Erik Swenson, Aurora, CO (US); Swapnil Tilaye, Thornton, CO (US)

(73) Assignee: DISH Network L.L.C., Englewood, CO (US)

( * ) Notice: Subject to any disclaimer, the term of this patent is extended or adjusted under 35 U.S.C. 154(b) by 29 days.

(21) Appl. No.: 16/412,283

(22) Filed: May 14, 2019

(65) Prior Publication Data

US 2020/0213193 A1 Jul. 2, 2020

Related U.S. Application Data

(60) Provisional application No. 62/787,056, filed on Dec. 31, 2018.

(51) Int. Cl.
*H04L 12/70* (2013.01)
*H04L 12/24* (2006.01)
(Continued)

(52) U.S. Cl.
CPC ......... *H04L 41/0806* (2013.01); *H04L 67/12* (2013.01); *H04W 48/08* (2013.01)

(58) Field of Classification Search
CPC .... H04L 41/0806; H04L 67/12; H04W 48/08; H04W 8/18; H04W 60/00; H04W 8/005; H04W 4/70

(Continued)

(56) References Cited

U.S. PATENT DOCUMENTS 9,590,961 B2 3/2017 Sundaram et al.
2017/0195424 A1 7/2017 Nasir et al.
(Continued)

FOREIGN PATENT DOCUMENTS

WO 2017/019946 A1 2/2017

OTHER PUBLICATIONS

International Search Report and Written Opinion for PCT/US2019/066131 dated Mar. 10, 2020, all pages.

*Primary Examiner* — Moustafa M Meky
*Assistant Examiner* — Elizabeth Kassa
(74) *Attorney, Agent, or Firm* — Kilpatrick Townsend & Stockton LLP

(57) ABSTRACT

Various techniques are described herein for autonomously registering and/or activating Internet-of-Things (IoT) devices, provisioning wireless network access of those devices, and connecting the IoT device to an NB-IoT network with agreed-to terms for network usage. In various embodiments, IoT devices may be configured to negotiate for NB-IoT network access by (i) sharing their data with the NB-IoT network provider, (ii) security storing and using cryptocurrency to obtain NB-IoT network access, and/or (iii) automatically providing the NB-IoT network provider with access to data from other associated IoT devices and/or with payment from a separate payment provider. Individual IoT devices may be preconfigured with negotiation terms for NB-IoT network access, pre-associated with other devices/users, and/or pre-loaded with cryptocurrency in a secure storage.

20 Claims, 9 Drawing Sheets

(51) Int. Cl.
 *H04W 48/08* (2009.01)
 *H04L 29/08* (2006.01)
(58) Field of Classification Search
 USPC .......................................................... 709/223
 See application file for complete search history.

(56) References Cited

U.S. PATENT DOCUMENTS

| | | | | |
|---|---|---|---|---|
| 2017/0232300 | A1* | 8/2017 | Tran ........................ | G06F 3/017 |
| | | | | 434/247 |
| 2017/0359417 | A1* | 12/2017 | Chen ....................... | G06Q 30/01 |
| 2018/0218466 | A1* | 8/2018 | Mowatt ............... | G06Q 30/0645 |
| 2018/0330349 | A1* | 11/2018 | Uhr .................... | G06Q 20/3827 |
| 2018/0337769 | A1* | 11/2018 | Gleichauf ............ | G06Q 20/065 |
| 2019/0026716 | A1* | 1/2019 | Anbukkarasu ........... | G06F 21/44 |
| 2019/0034892 | A1* | 1/2019 | Smith .................... | G06N 5/022 |
| 2019/0349733 | A1* | 11/2019 | Nolan ................ | H04L 41/0806 |
| 2019/0391829 | A1* | 12/2019 | Cronie ................... | G06F 21/53 |
| 2020/0050494 | A1* | 2/2020 | Bartfai-Walcott | .... G06F 9/5083 |

\* cited by examiner

INTERNET-OF-THINGS DEVICE AUTONOMOUS ACTIVATION

CROSS-REFERENCE TO RELATED APPLICATIONS

The present application is a non-provisional of and claims priority to U.S. Provisional Patent Application No. 62/787,056, filed Dec. 31, 2018, entitled "INTERNET-OF-THINGS DEVICE AUTONOMOUS ACTIVATION." The entire contents of provisional application No. 62/787,056 is incorporated herein by reference for all purposes.

TECHNICAL FIELD

The present disclosure relates to the activation and use of Internet-of-Things (IoT) devices over narrowband Internet-of-Things (NB-IoT) networks.

BACKGROUND

Narrowband Internet of Things (NB-IoT) refers to a standards-based low power wide area (LPWA) technology that can be used to support a wide range of IoT devices and services. NB-IoT, rather than operating in the LTE construct, instead may work independently, in unused 200-kHz bands used for GSM (Global System for Mobile Communications), and/or on LTE base stations allocating a resource block to NB-IoT operations. Compared to LTE-M1, NB-IoT has lower bitrates and better link budgets. Among other advantages, NB-IoT technologies allow for significantly reduced power consumption among IoT devices, improved system capacity, and spectrum efficiency. For example, using NB-IoT, the battery life for IoT devices may exceed 10 years for a wide range of use cases.

For these and other reasons, it is projected that many millions or even billions of IoT devices may be purchased and activated on NB-IoT networks in the coming years. However, conventional techniques of registering and activating such devices are often time-consuming, error-prone, and costly. To install new IoT devices, users are often required to navigate the processes of device registration, network identification and connection, device configuration, association of the device with one or more persons or accounts, and association of the device with payment account information to be used for any IoT device activities that require payment. These processes may be inefficient, error-prone, and time-consuming for both users and IoT network providers.

SUMMARY

Accordingly, aspects described herein provide techniques for autonomously activating and deactivating IoT devices within NB-IoT networks. Embodiments described herein include autonomously registering and/or activating IoT devices, provisioning network access, and connecting the IoT device to an NB-IoT network with an agreed-to contract for network usage. In various examples, IoT devices may be configured to negotiate for NB-IoT network access by (i) sharing their data with the NB-IoT network provider, (ii) security storing and using cryptocurrency to obtain NB-IoT network access, and/or (iii) automatically providing the NB-IoT network provider with access to data from other associated IoT devices and/or with payment from a separate payment provider. Individual IoT devices may be preconfigured with negotiation terms for NB-IoT network access, pre-associated with other devices/users, and/or pre-loaded with cryptocurrency in a secure storage. Thus, the IoT devices may be autonomously registered and activated NB-IoT network using smart contracts and/or block chain, quickly and partially or entirely transparently to the device user and owner.

According to additional aspects described herein, after an IoT device has been provisioned for the NB-IoT network, compliance with the agreed-to terms (e.g., access to data, cryptocurrency exchanges, etc.) may be monitored by the NB-IoT network provider. If the IoT device fails out of compliance with the terms, the IoT device may be automatically deactivated from the NB-IoT network. Additionally, the costs of various types of sensor data collected by IoT devices, as well as network access costs, may change frequently based on a number of factors. Therefore, both the IoT device and/or the NB-IoT network provider may attempt to renegotiate sensor data access and/or network access on-the-fly. In some examples, IoT devices might agree to trade only certain subsets of their sensor data in exchange for NB-IoT network access. Further, depending on the value of device's data, the NB-IoT network provider may agree to provide network access and also to pay the IoT device (e.g., in cryptocurrency) for its sensor data. For IoT devices associated with other devices, users/accounts, and/or third-party payers, the negotiation and terms of the initial IoT network provisioning, as well as any changes in terms or on-the-fly renegotiations, may include granting/denying access to the sensor data from the other associated devices, obtaining authorizing from the associated users/accounts, and/or obtaining/denying funding from the third-party payers.

BRIEF DESCRIPTION OF THE DRAWINGS

The present invention is described in conjunction with the appended figures.

Figure 1:
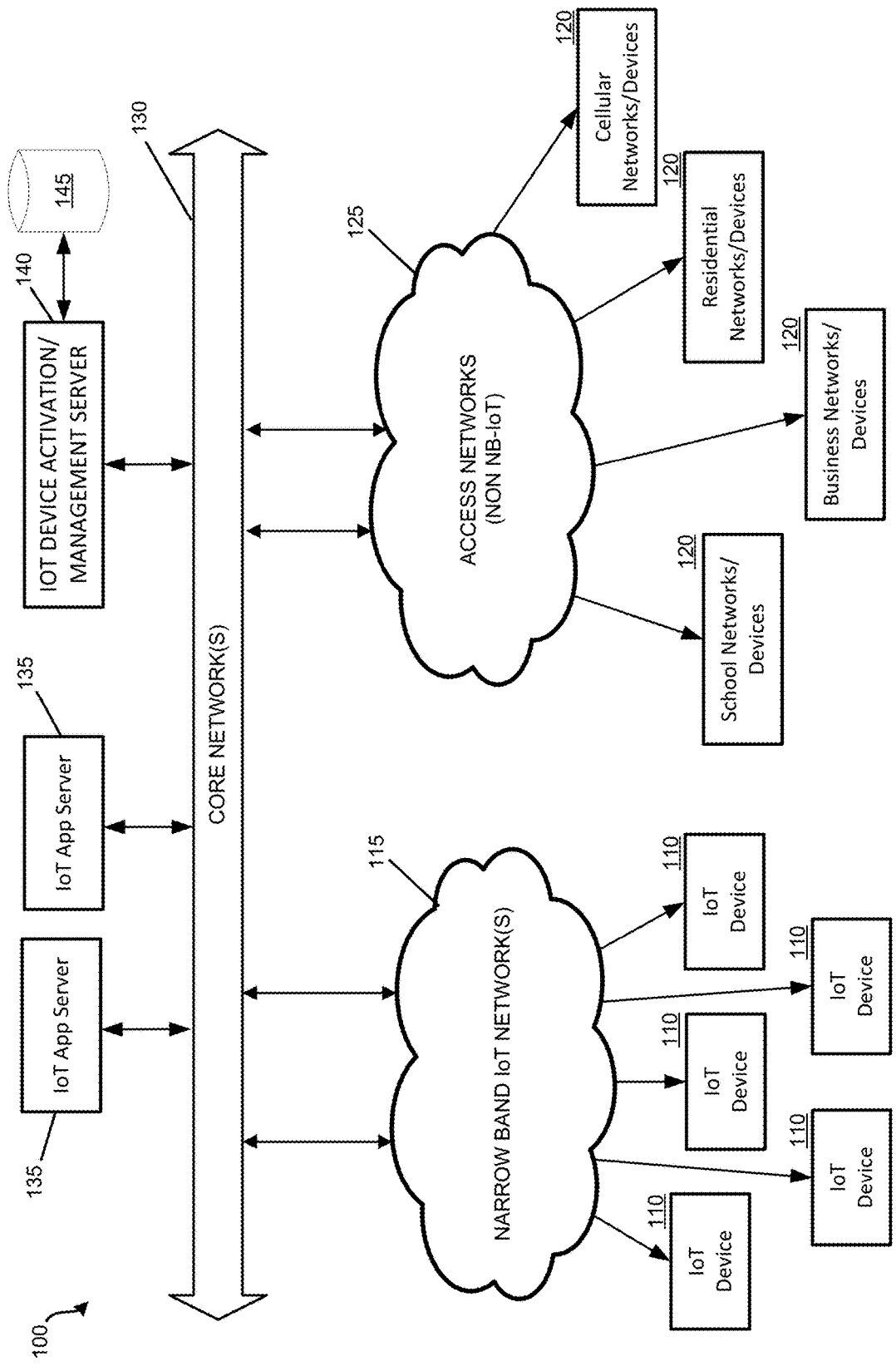
FIG. 1 is a block diagram illustrating a computing environment support Internet-of-Things (IoT) and/or other devices, in accordance with one or more embodiments of the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

Various techniques (e.g., systems, methods, computer-program products tangibly embodied in a non-transitory computer-readable storage medium, etc.) are described herein for autonomously activating and deactivating IoT devices within NB-IoT networks. Embodiments described herein include autonomously registering and/or activating IoT devices, provisioning network access, and connecting the IoT device to an NB-IoT network with an agreed-to contract for network usage. In various examples, IoT devices may be configured to negotiate for NB-IoT network access by (i) sharing their data with the NB-IoT network provider, (ii) security storing and using cryptocurrency to obtain NB-IoT network access, and/or (iii) automatically providing the NB-IoT network provider with access to data from other associated IoT devices and/or with payment from a separate payment provider. Individual IoT devices may be preconfigured with negotiation terms for NB-IoT network access, pre-associated with other devices/users, and/or pre-loaded with cryptocurrency in a secure storage. Thus, the IoT devices may be autonomously registered and activated NB-IoT network using smart contracts and/or block chain, quickly and partially or entirely transparently to the device user and owner.

Additional aspects described herein relate to monitoring compliance of the agreed-to terms for NB-IoT network access (e.g., access to sensor data, transfers of cryptocurrency, etc.) between the IoT device and the NB-IoT network provider, after an IoT device has initially been provisioned for the NB-IoT network. If the IoT device fails out of compliance with the terms, the IoT device may be automatically deactivated from the NB-IoT network. Additionally, the costs of various types of sensor data collected by IoT devices, as well as network access costs, may change frequently based on a number of factors. Therefore, both the IoT device and/or the NB-IoT network provider may attempt to renegotiate sensor data access and/or NB-IoT network access on-the-fly. In some examples, IoT devices might agree to trade only certain subsets of their sensor data in exchange for NB-IoT network access. Further, depending on the value of device's data, the NB-IoT network provider may agree to provide network access and also to pay the IoT device (e.g., in cryptocurrency) for its sensor data. For IoT devices associated with other devices, users/accounts, and/or third-party payers, the negotiation and terms of the initial IoT network provisioning, as well as any changes in terms or on-the-fly renegotiations, may include granting/denying access to the sensor data from the other associated devices, obtaining authorizing from the associated users/accounts, and/or obtaining/denying funding from the third-party payers.

The various embodiments described herein may be implemented on and within one or more different networks and systems, including satellite or terrestrial (e.g. cable) television distribution systems, telecommunications network systems, television distribution computer networks such as the Internet, cellular and other mobile networking systems, and the like. Therefore, although certain examples below are described in terms of specific types of user equipment (e.g., set-top boxes and other television receivers having digital video recorders, etc.) within specific systems (e.g., satellite television distribution systems), it should be understood that similar or identical embodiments may be implemented using other network systems and architectures (e.g., cable television networks, on-demand distribution networks, Internet television computer networks), as well as other user equipment and devices (e.g., personal computers, servers, routers, gaming consoles, smartphones, etc.).

Referring now to FIG. 1, an example computing environment 100 is illustrated, including a number of IoT devices 110 operating through a narrowband IoT network 115, a number of additional devices/networks 120 operating through one or more additional networks 125, although with backend IoT application servers 135 and a backend IoT device activation/management server 140. Various aspects and embodiments of the present disclosure may be implemented within a similar computing environment 100, in which an IoT device activation/management server 140 may communicate with IoT devices 100 to negotiate and provision NB-IoT network access, register and activate/deactivate the devices 100, and communicate as needed with networks of associated devices 120.

IoT devices 110 may include any physical object having Internet connectivity. Thus, the numbers and types of IoT devices 110 in any particular implementation may be limitless. Generally, IoT devices 110 may be configured for NB-IoT and/or Long Term Evolution (LTE) radio access. Additionally, for IoT devices 110 communicating via an NB-IoT network 115, there may be additionally technical advantages/efficiencies realized for those IoT devices 110 which are inexpensive, require long transmission ranges, have a small power budget, and do not transmit large amounts of data. Thus, potential examples of IoT devices 110 may include security systems, intruder and fire alarm systems, utility meters (e.g., for gas, water, electrical, etc.), weather sensors, facility management services, vehicle-based systems, personal appliances/health monitoring devices, industrial appliances and systems (e.g., PLC devices), personal electronic appliances, person or animal tracking devices, lighting systems or speaking systems in public or commercial environments, or governmental infrastructure devices (e.g., street lamps, traffic lights, trash bins, etc.). As discussed below in more detail in reference to FIG. 5, the design and features of different IoT devices 110 may vary widely. However, most or all IoT devices may have at least sensors for detecting/collecting data, processing units and memory, input devices, and/or wireless communication interfaces for communicating through one or more networks with a backend IoT application server 135.

In some implementations, IoT devices 110 may have circuitry and processing resources capable of obtaining location related measurements (also referred to as location measurements), such as measurements for signals received from GPS or other Satellite Positioning System (SPS) space vehicles (SVs), measurements for cellular transceivers such as eNBs, and/or measurements for local transceivers. IoT devices 110 may further have circuitry and processing resources capable of computing its position fix or estimated location based on these location related measurements. In some implementations, location related measurements obtained by an IoT device 110 may be transferred to an IoT application server 135, which may estimate or determine a location for the IoT device 110 based on the measurements.

The NB-IoT network 115 may include one or more cellular or computer network infrastructures configured to a support a narrowband IoT (NB-IoT) standard (also referred to as LTE Cat-NB1). NB-IoT is a Radio Access Type (RAT) supported by the evolved Universal Mobile Telecommunications Service (UMTS) Terrestrial Radio Access Network (E-UTRAN), that was added by 3GPP in specifications for 3GPP Release 13 to provide 200 KHz UL/DL (Uplink/Downlink) carrier bandwidth (and 180 KHz UL/DL usable bandwidth). The CIoT concerns EPC (evolved packet core) support for NB-IoT, IoT and MTC and is complimentary to NB-IoT (e.g., NB-IoT is concerned with E-UTRAN and CIoT is concerned with the EPC).

As noted above, an NB-IoT network 115 may exist in independently licensed bands, in unused 200 kHz bands that have previously been used for GSM or CDMA, or on LTE base stations that may allocate a resource block to NB-IoT operations or in their guard bands. Although several examples herein refer to NB-IoT network(s) 115, it should be understood that in other embodiments, Long Term Evolution (LTE) or other similar or equivalent network standards may be used. For example, an LTE Cat-M1 (also referred to as LTE-M) network 115 may be used in certain embodiments. The LTE-M and NB-IoT standards have many similarities, although while an LTE-M network may be deployed within a current cellular network, an NB-IoT network by contrast does not operate in the LTE construct.

In some embodiments, NB-IoT network 115 may include one or more of an E-UTRAN and an EPC, which may be part of a Visited Public Land Mobile Network (VPLMN) that is a serving network for one or more IoT devices 110, and which may communicates with a Home Public Land Mobile Network (HPLMN) for the IoT device 110. A VPLMN E-UTRAN, VPLMN EPC and/or HPLMN may interconnect with other networks. For example, the Internet may be used to carry messages to and from different networks such as the HPLMN and the VPLMN EPC. For simplicity these networks and associated entities and interfaces are not shown. As shown, the network architecture 100 may provide packet-switched services to the IoT devices 110. However, as those skilled in the art will readily appreciate, the various concepts presented throughout this disclosure may be extended to networks providing circuit-switched services.

Examples of network technologies that may support wireless communication include NB-IoT 115, but may further include GSM, CDMA, WCDMA, LTE, NR, HRPD and eMTC radio types. NB-IoT, CIoT, GSM, WCDMA, LTE, eMTC and NR are technologies defined by (or expected to be defined by) 3GPP. CDMA and HRPD are technologies defined by the 3rd Generation Partnership Project 2 (3GPP2). WCDMA is also part of UMTS and may be supported by an HNB. Cellular transceivers, such as eNBs, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

In this example, the NB-IoT network 115 may connect to a core network 130, on which various IoT applications server 135 and the IoT device activation and management server 140 reside. Core network 130 may be an IP-based Internet backbone configured to interconnect several different NB-IoT networks 115, LANs or subnetworks, and/or other access networks 125. In this example, access networks 125 may include Ethernets 120, wired or wireless LANs 120, fiber optic networks 120, cable networks 120, satellite networks 120, cellular networks 120, etc. Examples of several access networks are described below in more detail in reference to FIG. 3. As discussed below, the electronic devices 120 accessible via access networks 125 may be related to certain IoT devices 110, and may be associated with the same owner, subscription/account, physical location or organization. Thus, although a first IoT device 110 and a second appliance or user device 120 may be of different device types, installed at different locations, and communicate with backend servers over different networks, if the devices are commonly owned or otherwise related, the IoT device activation and management server 140 may access/communicate with the associated user device 120 in order to provide network access to the IoT device 110. Additionally, although the IoT device activation and management server 140, and related database 145, are shown in this example as being accessible through the core network 130, in other embodiments some or all of the IoT device activation and management server 140 and/or database 145 may be implemented within the NB-IoT network 115.

Figure 2:
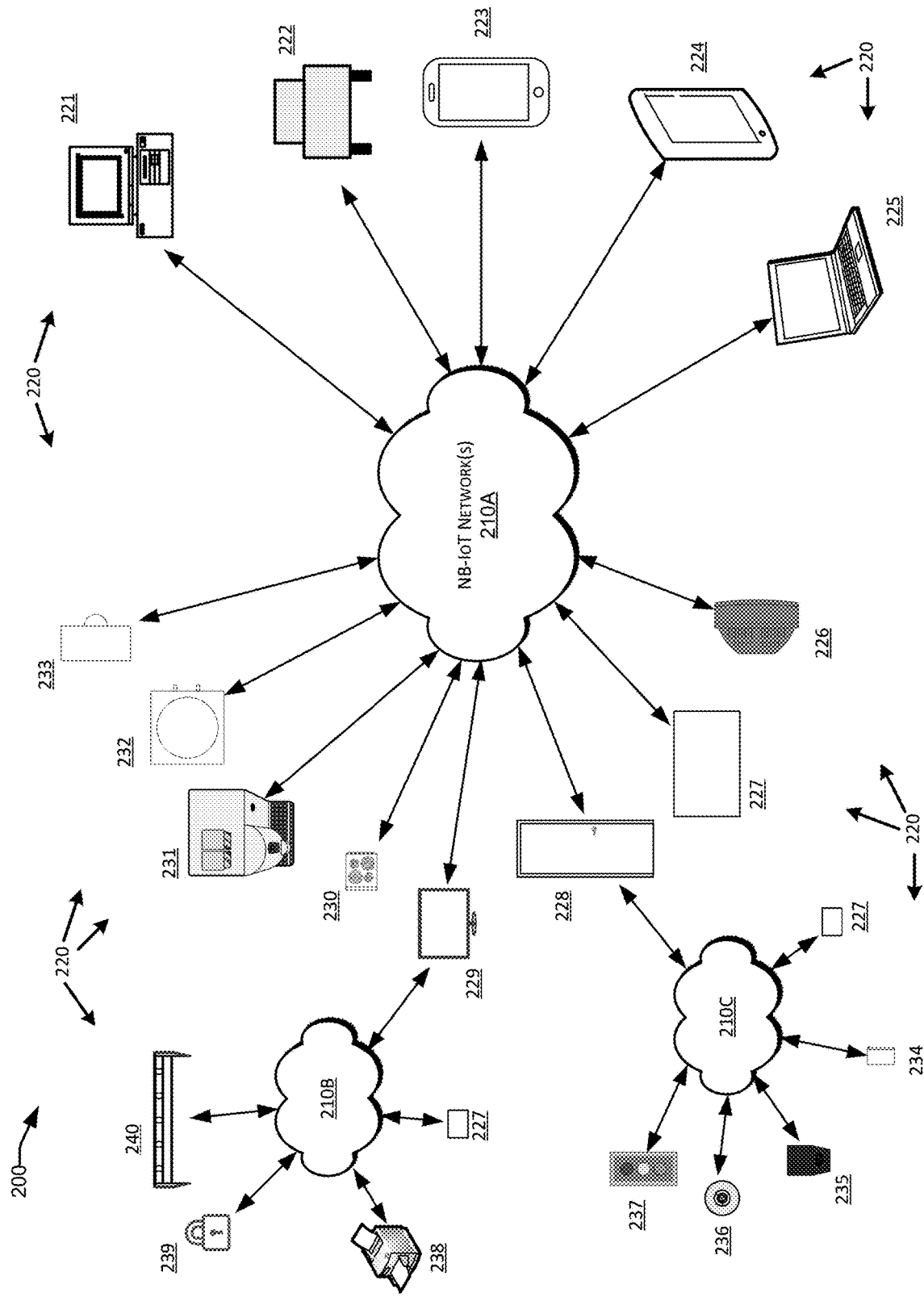
FIG. 2 a block diagram illustrating an example Internet-of-Things (IoT) system, in which a number of IoT devices are configured to communicate over one or more IoT networks, in accordance with one or more embodiments of the disclosure

Referring now to FIG. 2, an example IoT system 200 is shown, in which a number of IoT devices 220 are configured to communicate over one or more IoT networks 210. Thus, IoT system 200 may correspond to the IoT devices 110 and NB-IoT network 115 described above. As noted above, IoT system 200 may consist of an NB-IoT network, LTE network, and/or any of the other IoT compatible networks discussed herein. Additionally, although only twenty different IoT devices 221-240 (which may be referred to individually or collectively as IoT device(s) 220), and three separate IoT communication networks 210a, 210b, and 210c (which may be referred to individually or collectively as IoT network(s) 210 or IoT interface (s) 210) are shown in this example, it should be understood that this architecture is illustrative only, and any number IoT devices 220 may communicate via any number of different IoT networks 210 in other embodiments.

As noted above, IoT devices 220 may include various NB-IoT devices which are optimized and configured for NB-IoT network standards. Each IoT device 220 may include specialized sensors and inputs configured for its specific purpose(s), and be configured to transmit data infrequently, over long transmission ranges, and to require a very small power budget. In this example, IoT devices 220 may include wireless electronic devices such as security systems, intruder and fire alarm systems, utility meters (e.g., for gas, water, electrical, etc.), weather sensors, facility management services, vehicle-based systems, personal appliances/health monitoring devices, industrial appliances and systems (e.g., PLC devices), personal monitoring/home monitoring electronic appliances, person or animal tracking devices, lighting systems or speaking systems in public or commercial environments, or governmental infrastructure devices (e.g., street lamps, traffic lights, trash bins, etc.).

IoT network(s) 210 may be built upon IP-based networks and/or cellular, cable, or satellite content provider networks. Some or all of the IoT device(s) 220 thus may be electronic devices operating at a residential location, business location, school or governmental office, or other installation network, and may communicate with a core network 130 and backend servers 135-140 via local network equipment (e.g., a television receiver, modem, router, etc.). In other examples, IoT devices 220 may be installed at separate locations accessible via cellular based networks such as NB-IoT or LTE, and/or combinations of multiple network types (e.g., including the Internet and one or more cellular/wireless data networks). Thus, IoT devices 220 may be widely distributed, operating separately and independently from other IoT devices 220 or IoT networks, both with respect to geography and with respect to the computing environments, networks, and protocols used to access the devices.

In some embodiments, IoT network(s) 210 may correspond to peer-to-peer (P2P) networks formed among the various IoT devices 220. Such networks may be wired or wireless, and may use any combination of known network protocols and technologies, including IP-based networks (e.g., WiFi, IEEE 802.11), RF networks, Bluetooth networks, cellular networks, NFC-based communications, etc. In some examples, IoT network(s) 210 may be based on short-range wireless technologies, and thus IoT devices 220 may discover and communicate with other IoT devices 220 that are within close proximity of each other. Of course, it should be understood that long-range embodiments are also possible, and thus IoT devices 220 in direct or indirect communication might be located in different cities or different countries.

In this example, IoT devices 221-225 may correspond to multi-purpose and/or general purpose computing devices, including personal computer 221, vehicle-based computer system (e.g., vehicle-based automation and assistant device) 222, smartphone 223, tablet computer 224, and laptop 225. Such multi-purpose and/or general purpose devices 221-225 may be equipped with user input components (e.g., keyboard, mouse, microphone, touchscreen, etc.) and corresponding software to receive and process a variety of requests from users. Additionally, IoT device 221-225 also may have IP-based network interfaces and the capability to connect to the Internet through one or more wide area network connections (e.g., cellular, WiFi, etc.). Therefore, such multi-purpose and/or general purpose devices 221-225 may correspond to IoT controller devices in many examples discussed herein. In contrast, IoT devices 226-240 in this example may correspond to various appliances, sensors, and/or simpler single-purpose electronic devices. Devices 226-240 also may or may not have Internet connectivity, and also may or may have general user input components. Accordingly, such devices 226-240 may correspond to IoT thing devices in many examples discussed herein. In some cases, IoT thing devices may be passive devices, such as simple electronic devices having RFID tags, NFC tags, simple RF or infrared functionality, etc., which are capable of storing and transmitting device information over short ranges but could not act as IoT controller devices. However, even appliances, sensor devices, and other simple single-purpose devices may act as IoT controller devices in some cases, while general purpose devices such as personal computers 221, vehicle-based systems 222, smartphones 223, tablets 224, etc., may act as IoT thing devices.

Different examples of the interactions between IoT controller devices and IoT thing devices are described in more detail below. In some examples, IoT controller devices may receive and process user requests to perform tasks that will require interactions with one or more different IoT devices (e.g., IoT thing devices), and thus IoT controller devices may perform the processes of discovering accessible IoT thing devices, determining the purpose, status, and functions capable of being performed via the accessible IoT thing devices, and then invoking the appropriate functions on selected IoT thing devices to perform the tasks requested by the user. Thus, IoT controller devices may take the active role in discovering available (e.g., nearby) IoT thing devices, learning their capabilities, and instructing them to perform a desired set of functions, while IoT thing devices may take a more passive role of receiving and responding to requests from IoT controller devices.

However, in some cases, IoT thing devices also may take active roles during IoT device interactions, and perform the functions of IoT controller devices. For example, during a device discovery process, an IoT controller device 223 may broadcast a query to all accessible IoT things devices, seeking an available printer. Although none of the IoT things devices accessible to the IoT controller 223 is a printer, each IoT thing device may be able to connect to a broader network of additional IoT thing devices that are not directly accessible to the IoT controller 223. In this example, a monitor 229 IoT thing device may perform its own device discovery process to locate a printer IoT device 238, and may relay information about the printer device 238 (e.g., a device ID, description, status, location, etc.) to the IoT controller 223.

As another example, an IoT controller device (e.g., vehicle-based system 222) may receive a request from a user to open the front door of the user's house. Through device discovery and inquiry, the IoT controller 222 may identify door 228 as the correct IoT thing device, and may transmit an open request to the door IoT thing device 228. In response, the door IoT device 228 may, based on its own internal programming, decide to turn on one or more lights and/or begin playing music in response to the door being opened. Thus, the door IoT thing device 228 may take the role of an IoT controller by discovering and then instructing one or more light IoT thing devices 236 and/or speaker IoT thing devices 236 to perform the desired functions.

Thus, the IoT devices 220 more commonly used in NB-IoT implementations, such as security systems, alarm systems, utility meters, weather sensors, facility management services, vehicle-based systems, personal appliances/health monitoring devices, industrial appliances and systems, personal electronic appliances, person or animal tracking devices, lighting systems or speaking systems in public or commercial environments, or governmental infrastructure devices (e.g., street lamps, traffic lights, trash bins, etc.), may be configured to individually collect their respective sensor data, and to individually communicate with backend servers 135-140 via the NB-IoT 115 and core network 130. However, in other cases, these IoT devices 220 may work in collaboration (e.g., IoT thing/IoT controller relationships) and/or may discover and use combinations of device capabilities and network transmission techniques of nearby devices 220 to perform various data collecting and transmitting functionality.

Figure 3:
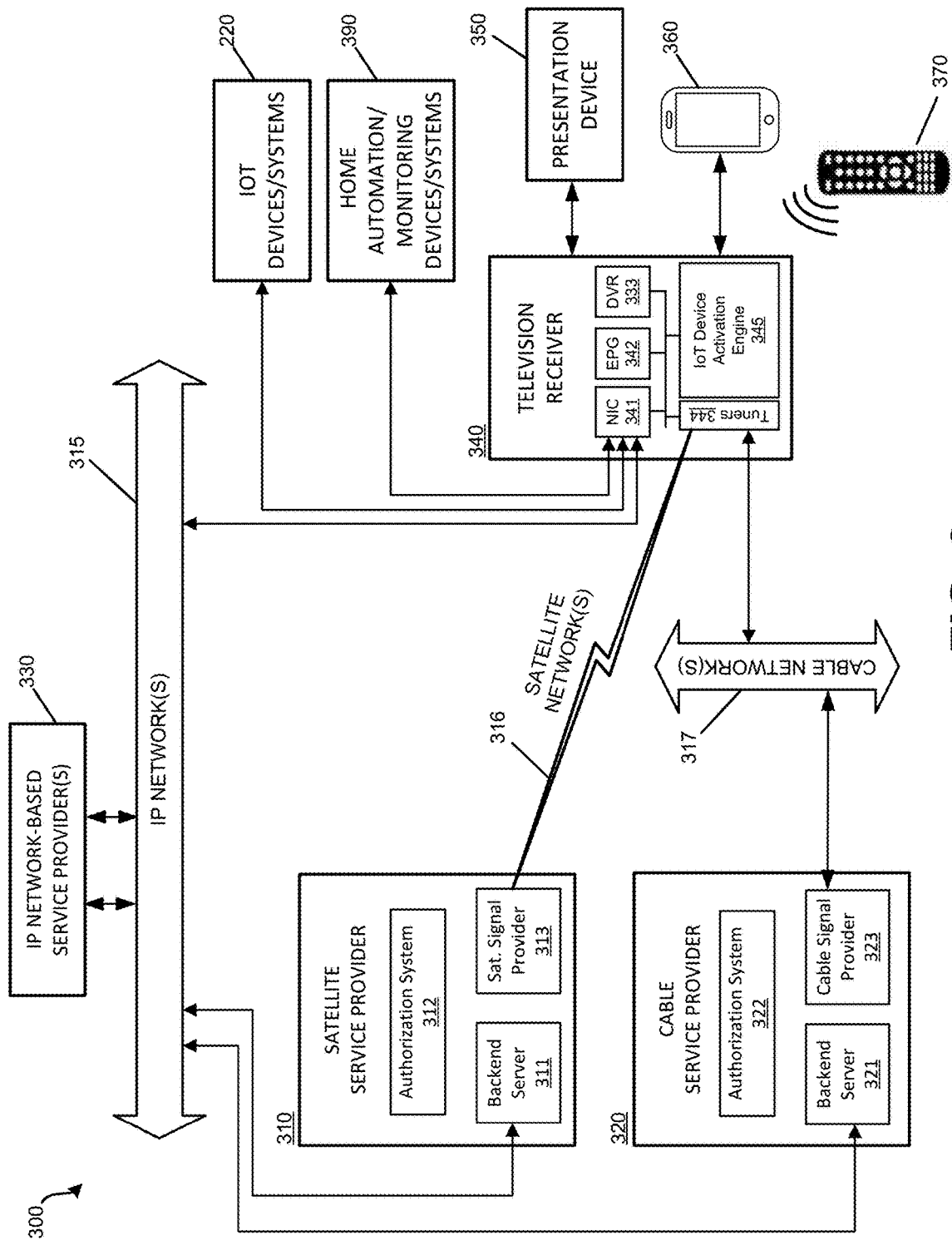
FIG. 3 is a block diagram illustrating a video resource delivery and home automation/monitoring system, in accordance with one or more embodiments of the disclosure.

Referring now to FIG. 3, an example home monitoring system 300 is shown, including one or more IoT devices 220 and/or other home automation and monitoring devices or systems 190, configured to operate at a residential location or other installation location (e.g., business, school, governmental building, etc.). Thus, home monitoring system 300 may correspond to a residential/school/business network and devices 120, and access network 125, as described above in reference to FIG. 1. As noted above, aspects described herein relate to autonomous activation and management of IoT devices 110. However, techniques for activating, registering, and managing IoT devices 110 via NB-IoT networks 115 may be similarly used for activating, registering, and managing IoT devices 120 or other home automation/monitoring devices 190 over non-NB-IoT access networks 125 and other network infrastructures. Further, as noted above, activation and management of IoT devices 110 over NB-IoT networks 115 may include communication with separate commonly-owned or associated devices over different networks. Therefore, this example illustrates a home monitoring system 300 that may be implemented at a residential location, business location, school or governmental location, etc., using one or more access networks 125 to communicate with the same backend IoT application servers 135 and/or IoT activation/management servers 140. It should also be understood that this architecture is illustrative only, and different types of network nodes 140 (e.g., television receivers, set-top boxes, modems, routers, laptops, tablets, etc.), any number/type of IoT devices 220, home automation devices 390, and/or networks 115-117 may be implemented in other embodiments.

In the example shown in FIG. 3, the television receiver 340 may collect data from IoT devices 220 and/or other home monitoring devices 390, analyze and transmit the sensor data to back-end services providers 310, 320, 330 (e.g., IoT application servers 135 and/or activation management server 140), which may use the data received from the receiver 340 (which may be modem, router, or other network device) to negotiate NB-IoT network access for IoT devices and to provision those devices with network access. In some cases, the data transmitted from the receiver 340 to the one or more content providers 310-330 via the IP network 315 may be secure and/or confidential, and thus may use secure data transmission protocols and/or encryption to protect the user requests, transmissions of user monitoring data, location monitoring data, user tracking data, etc. Additionally, in some embodiments, data from certain devices (e.g., 390) may be transmitted via a first network (e.g., IP network 315) while the data from other devices (e.g., 220) may be transmitted via different networks (e.g., television networks 316-317).

In order to perform these features and the additional functionality described below, each of the components and sub-components shown in example system 300, such as television receiver 340, the servers and systems within the satellite, cable, and computer network-based television providers 310-330, presentation device 350, mobile device 360, remote control 370, IoT devices 380, and home automation devices/systems 390, etc., may correspond to a single computing device or server, or to a complex computing system including a combination of computing devices, storage devices, network components, etc. Each of these components and their respective subcomponents may be implemented in hardware, software, or a combination thereof. The components shown in system 300 may communicate via communication networks 315-317 (as well as other communication networks not shown in this figure), either directly or indirectly by way of various intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the television receiver 340, television/video service providers 310-330, and other components within system 300.

The television (and/or video) receiver 340 may be implemented using various specialized user equipment devices, such as cable system set-top boxes, satellite system set-top boxes, WiFi or Internet-based set-top boxes, gaming consoles, and the like. In other examples, the receiver 340 may be implemented using (or integrated into) other computing devices such as personal computers, network routers, tablet computers, mobile devices, etc. Thus, the receiver 340 may be implemented as a single computing device or a computing system including a combination of multiple computing devices, storage devices, network components, etc. In some examples, a television receiver 340 may correspond to a primary television receiver (PTR) which may include one or more network interface components (NICs) 341, an electronic programming guide (EPG) user interface component 342, a digital video recorder (DVR) 343, and/or a plurality of tuners 344, and related hardware/software components (e.g., audio/video decoders, descramblers, demultiplexers, etc.). In some cases, television receivers 340 may include one or more internal data stores and/or external data stores (e.g., external storage systems, database servers, file-based storage, cloud storage systems, etc.) configured to store television programs (e.g., audio/video files corresponding to television shows or movies, sporting events, live broadcasts, etc.), as well as image data and music/audio content that may be stored on television receivers 340 and output via presentation devices 350 and/or mobile devices 360. In some embodiments, such data stores may reside in a back-end server farm, storage cluster, and/or storage-area network (SAN). As shown in this example, an IoT device activation engine 345 also may be implemented within the television receiver 340 to perform various functionality relating to configuring and activating IoT devices 110 and 220, both remote and local, as well as other electronic devices 390, including transmitting monitoring data to back-end systems 310-330, and/or performing specific functionality based on certain monitoring data, as described in more detail below.

As shown in this example, television receiver 340 may be configured to communicate with television and/or video service providers 310-330 over multiple communication networks 315-317. As shown in this example, receiver 340 may receive television and/or video content from multiple television providers simultaneously, including a satellite television service provider 310, a cable television service provider 320, and one or more computer-network based television providers. Although three example providers 310-330 are shown in FIG. 3, it should be understood that any number of different television providers may be used in other embodiments, including embodiments in which a receiver 340 is only in communication with one or two of the providers 310-330, and embodiments in which the receiver 340 is in communication with additional satellite and cable television service provider, on-demand television providers, pay-per-view (PPV) television providers, Internet-based television providers, television streaming services, etc. Additionally, although various components within the television receiver 340 and television service providers 310-330 are illustrated as standalone computer systems in this example, any or all of these components may be implemented within and/or integrated into one or more servers or devices of various content distribution systems and other computing architectures. For example, as discussed below, the IoT device activation/management engine 345 may be implemented solely within a television receiver 340, modem, router, or user computing device (e.g., as a smartphone application), or may be implemented within a combination of devices within a television/video distribution system, or other location monitoring systems. For example, the IoT device activation/management engine 345 may be implemented within one or more back-end servers 311, 321, and 330, or as a standalone component and/or in a distributed manner, within other types of content distribution systems, such as terrestrial (e.g., cable) television distribution systems, telecommunications network systems, LAN or WAN computer networks (e.g., the Internet), cellular and other mobile networking systems, and any other computing environment. In any of these examples, the IoT device activation/management engine 345 may be implemented within (or integrated into) television receivers 340 as shown in FIG. 3, and/or within one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services.

Television/video content received and/or decoded by television receiver 340 may be presented via one or more presentation devices 350. Presentation devices 350 may correspond to televisions and other television viewing devices (e.g., home computers, tablet computers, smartphones, etc.). Additionally, various systems 300 may incorporate other user equipment and devices, such as mobile devices 360 and remote control devices 370 configured to communicate with associated television receivers 340 and/or presentation devices 350. User devices 360 may include mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). In some embodiments, user devices 360 may be associated with specific television receivers 340 and/or specific users/customer accounts associated with the receiver 340 and/or system 300. As shown in FIG. 3, user devices 360 may be configured to receive data from and transmit data to an associated television receiver 340. Additionally or alternatively, user devices 360 may be configured to communicate directly with one or more television service providers 310-330, so that certain transmissions of video content and other functionality (e.g., collecting and transmitting sensor data from IoT devices 220 and/or home automation and monitoring devices 390, etc.) may potentially bypass the television receiver 340 in some embodiments.

Different presentation devices 350, user devices 360, and remote control devices 370 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different such devices 350-370 may support different input and output capabilities, and thus different types of user notifications and user inputs in response to notifications (e.g., sensor detection from IoT devices 220 and HAS devices 390) may be compatible or incompatible with certain devices 350-370. For example, certain notifications generated and output by a television receiver 340, or television/video service providers 310-330, may require specific types of processors, graphics components, and network components in order to be displayed (or displayed optimally) on a user device 360. Additionally, different types of user notifications may include different interactive user response features that require various specific input capabilities for presentation devices 350, user devices 360, and remote control devices 370, such as keyboards, mouses, touchscreens, voice control capabilities, gesture recognition, and the like. In some embodiments, the content of user notifications and/or the user response components may be customized based on the capabilities of the presentation device 350 and/or user device 360 selected to output the notification. Additionally, in some cases, users may establish user-specific preferences, which may be stored in the memory of the television receiver 340, for outputting specific types of user notifications to specific types of presentation devices 350 and/or user devices 360.

System 300 also may include one or more IoT devices 220, and one or more home monitoring (or personal monitoring) and automation devices or systems 390. home automation devices 390 (discussed below in reference to FIG. 4) and IoT devices 220 (discussed in more below in reference to FIG. 5) each may include a variety of devices configured to collect and analyze various sensor data proximate to the location of the system 300, including location data (e.g., sights, sounds, smells, etc.), personal user monitoring data and/or device operational status data, etc. As described below in more detail, the sensor data received and analyzed by sensors 220 and/or 390 may be used to identify and track particular individuals and objects, as well as initiate communications, alerts, and/or other functionality via IoT devices 220 and home monitoring devices 390.

Home monitoring and automation devices and systems 390 may include networks of one or more location-based sensors, device sensors, and/or appliance sensors configured to collect and analyze data relating to a user location, such as user's home, office, etc. An example of a home monitoring and automation system 390, HAS 400, is described below in FIG. 4. Devices and systems 390 may include personal and/or wearable computing devices configured to detect current health and activity data of a user near the system location 300. As discussed below, in some embodiments, a home monitoring and automation system 390 may be hosted by receiver 340, and may receive data from various sensors configured to monitor the current home environment and the operation of various home devices or appliances. The home monitoring and automation system 390 may collect such user/location data and transmit the data to the receiver 340 and/or other devices within the system 300. Personal and/or wearable computing devices 390 may be configured to detect current health and activity data of a user. Such devices 390 may include various health and activity sensors, heartrate and blood pressure sensors, sleep monitors, temperature monitors, user movement monitors, and personal exercise/fitness sensors that may detect and track the physical state and condition of the user. In some examples, certain personal monitoring devices may be insertable and/or embedded devices with sensors for monitoring various chemicals within the user's bloodstream, such as continuous glucose monitors, alcohol monitoring systems, and other chemical monitoring systems. Personal monitoring devices 390, whether embedded, insertable, wearable, or entirely external to the user (e.g., external monitoring cameras, microphones, and other sensors), may collect personal user biostatistics data and transmit the user data to the receiver 340 and/or other devices within the system 300.

The television receivers 340, television service providers 310-330, presentation devices 350, user devices 360, IoT devices 220, and/or home/personal automation and monitoring devices 290, each may include the necessary hardware and software components to establish network interfaces and transmit/receive video signals or data streams, user monitoring data and video output criteria, and/or user interfaces and notifications, etc. Some or all of these devices may include security features and/or specialized hardware (e.g., hardware-accelerated SSL and HTTPS, WS-Security, firewalls, etc.) in order to present the various confidential data transmitted between components (e.g., user and receiver identification data, user monitoring data, user video viewing data, user criteria and access restriction data for certain video resources, etc.), and to prevent hacking and other malicious access attempts within the system 300. In some cases, the television receivers 340 may communicate with television service providers 310-330, user devices 360, and/or sensor-based monitoring devices 220, 390 using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 300 may use, for example, the Secure Sockets Layer (SSL) or Transport Layer Security (TLS) protocol to provide secure connections between the television receivers 340, video content providers 310-330, user devices 360, and/or monitoring devices 220, 390. SSL or TLS may use HTTP or HTTPS to provide authentication and confidentiality.

As shown in this example, receiver 340 and providers 310-330, user devices 360, and/or user and location monitoring device/systems 380-390 may communicate over various different types of networks 315-317. For example, network 315 is an Internet Protocol (IP) network, which may use the Internet networking model and/or communication protocols. IP network 315 may include local area networks (LANs), wide area networks (WANs) (e.g., the Internet), and/or various wireless telecommunications networks. For example, when an IoT device activation/management engine 345 is implemented within a television receiver 340, wireless router, modem, or other local user equipment, then IP network 315 may include wireless local area networks (WLANs) or other short-range wireless technologies such as Bluetooth®, mobile radio-frequency identification (M-RFID), and/or other such communication protocols. In other examples, when at least a portion or component of a user video output engine is implemented remotely as a service in a backend server 311, 321, or 330, or other computer server, satellite hub, cable headend, etc., then IP network 315 may include one or more WANs (e.g., the Internet), various cellular and/or telecommunication networks (e.g., 3G, 4G or EDGE (enhanced data rates for global evolution), WiFi (IEEE 802.11 family standards, or other mobile communication technologies), or any combination thereof. Additionally, system 300 includes satellite networks 316 and cable data networks 317, which may be used in this example for respectively IoT device sensor data and IoT device network access terms and negotiation data to television receiver 340 and other user equipment. However, it should be understood that IP network 315 also may include various components of satellite communication networks and/or or terrestrial cable networks in some embodiments. For communication between presentation device 150, user devices 360, remote controls 370, and monitoring devices 220, 390, and their associated television receivers 340, then communications may include use of a WLAN and/or other short-range wireless technologies. However, for communication between television receivers 340 and remotely located mobile user devices 360 (and/or for user devices 360 that are configured to communicate directly with television service providers 310-330), and remotely-based located monitoring devices/systems 220, 390, then communications may include WANs, satellite networks, terrestrial cable networks, and/or cellular or other mobile telecommunication networks, etc.

Figure 4:
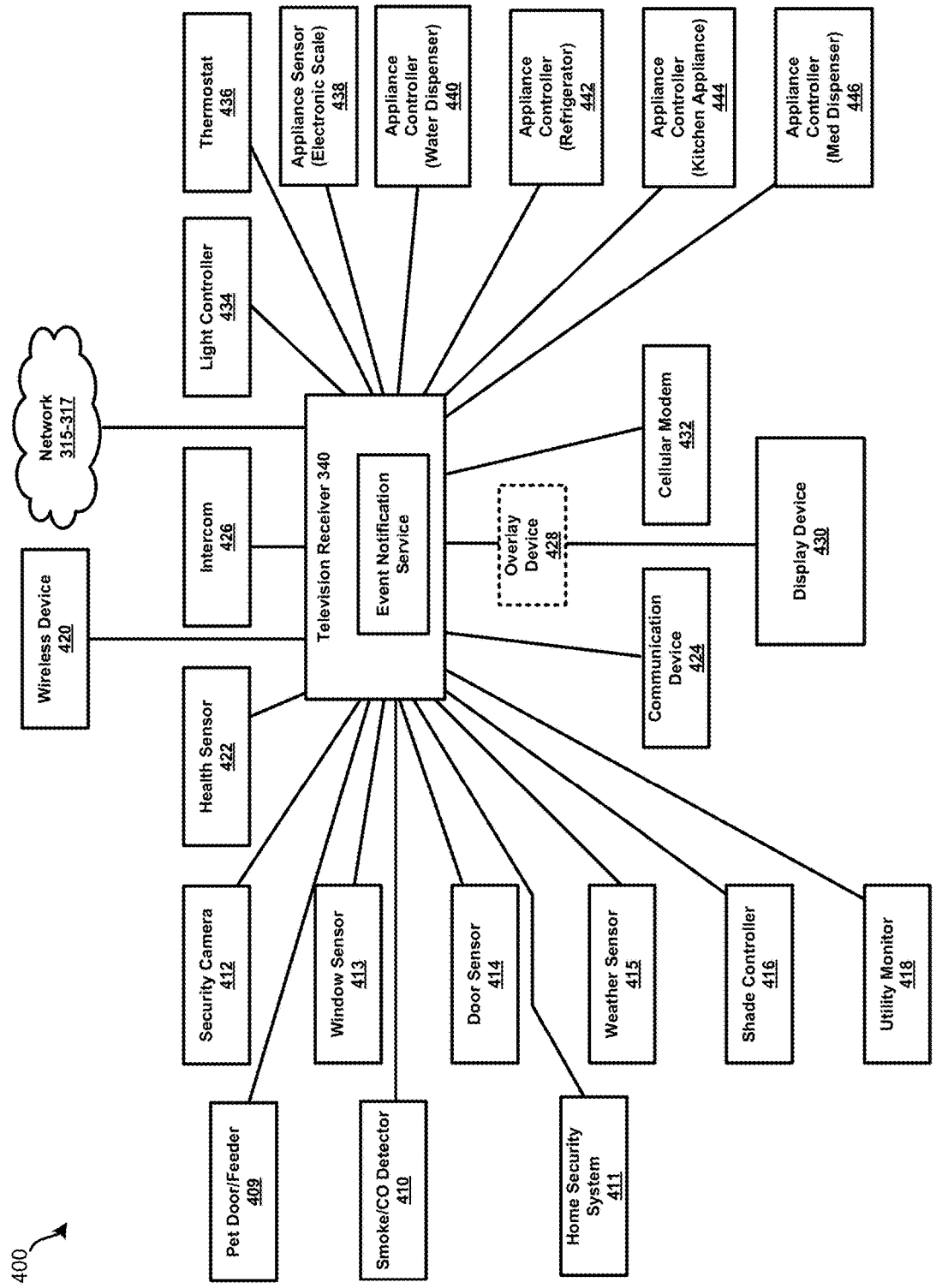
FIG. 4 is a block diagram illustrating a home automation system, in accordance with one or more embodiments of the disclosure.

Referring now to FIG. 4, an example home automation system (HAS) 400 is shown in accordance with certain embodiments. As discussed above, home monitoring and automation devices and systems 400 may be used separately from or in conjunction with one or more IoT devices 220. For example, home monitoring and automation devices and systems 400 may be used to monitor the same or related users and locations as IoT devices 110/220, and the sensor data may be combined in order to more accurately and efficiently monitor particular locations. Additionally, as discussed below, sensor data from HAS devices/systems may be provided via an IoT device activation/management engine 345 to a backend server 140 as part of the terms and conditions for activating and providing NB-IoT network access to a separate IoT device 110.

In this example, the home automation system 400 may be hosted by a receiver device 340 as shown in FIG. 3, and thus the receiver 340 may be considered a home automation gateway device or system. An overlay device 428 is also shown in FIG. 4. In another example, the HAS 400 may be hosted by the overlay device 428 of FIG. 4, and thus the overlay device 428 may be considered a home automation gateway device or system. Still other examples are possible. For instance, in some example, features or functionality of the overlay device 428 may be wholly or at least partially incorporated into the receiver device 340 (and vice versa), so that the HAS 400 may be considered to be hosted or managed or controlled by both receiver 340 and the overlay device 428. In this manner, the receiver 340, the overlay device 428, or any combination of functionality thereof, may be considered the central feature or aspect of the example HAS 400. Additionally, in still other examples, the HAS 400 might not be hosted by a receiver 340 or an overlay device, but may be operated by a standalone device 390 that may communicate with one or more receivers via an IP network 315 or other local communication protocols.

In this example, the receiver device 340 and/or the overlay device 428 may be configured and/or arranged to communicate with multiple sensor devices, including at least the various in-home, personal/wearable, or on-residence home automation related systems and/or devices shown in FIG. 4. Some examples of sensor devices may include, but are not limited to: at least one pet door/feeder 409, at least one smoke/$CO_2$ detector 410, a home security system 411, at least one security camera 412, at least one window sensor 413, at least one door sensor 414, at least one weather sensor 415, at least one shade controller 416, at least one utility monitor 418, at least one third party device 420, at least one health sensor 422, at least one communication device 424, at least one intercom 426, at least one overlay device 428, at least one display device 430, at least one cellular modem 432, at least one light controller 434, at least one thermostat 436, and one or more appliance sensors/controllers (e.g., scale sensor 438, water dispenser controller 440, refrigerator controller 442, a kitchen appliance controller 444, and an electronic medication dispenser 446). It should be understood that the HAS 400 depicted in FIG. 4 is just one example, and that other examples are possible as discussed further below.

In various embodiments, each of the elements of FIG. 4, with which the receiver device 340 communicates, may use different communication standards. For example, one or more elements may use or otherwise leverage a ZigBee® communication protocol, while one or more other devices may communicate with the receiver 340 using a Z-Wave® communication protocol. As another example, one or more elements may use or otherwise leverage a WiFi communication protocol, while one or more other devices may communicate with the receiver 340 using a Bluetooth communication protocol. Any combination thereof is further contemplated, and other forms of wireless communication may be used by particular elements of FIG. 4 to enable communications to and from the receiver 340, such as any particular IEEE (Institute of Electrical and Electronics Engineers) standard or specification or protocol, such as the IEEE 802.11 technology for example.

In some examples, a separate device may be connected with the receiver 340 to enable communication with the smart home automation systems or devices of FIG. 4. For instance, the communication device 424 as shown coupled with the receiver device 340 may take the form of a dongle. In some examples, the communication device 424 may be configured to allow for Zigbee®, Z-Wave®, and/or other forms of wireless communication. In some example, the communication device 424 may connect with the receiver 340 via a USB (Universal Serial Bus) port or via some other type of (e.g., wired) communication port. Accordingly, the communication device 424 may be powered by the receiver 340 or may be separately coupled with another different particular power source. In some examples, the receiver 340 may be enabled to communicate with a local wireless network and may use communication device in order to communicate with devices that use a ZigBee® communication protocol, Z-Wave® communication protocol, and/or some other wireless communication protocols.

In some examples, the communication device 424 may also serve to allow or enable additional components to be connected with the receiver device 340. For instance, the communication device 424 may include additional audio/video inputs (e.g., HDMI), component, and/or composite inputs to allow for additional devices (e.g., Blu-Ray players) to be connected with the receiver 340. Such a connection may allow video comprising home automation information to be "overlaid" with television programming, both being output for display by a particular presentation device. Whether home automation information is overlaid onto video on display may be triggered based on a press of a remote control button by an end-user.

Regardless of whether the receiver 340 uses the communication device 242 to communicate with any particular home automation device shown in FIG. 4 or other particular home automation device not explicitly shown in receiver 340, the receiver 340 may be configured to output home automation information for presentation via the display device 430. It is contemplated that the display device 430 could correspond to any particular one of the televisions and/or user devices describes above in FIGS. 1-3. Still other examples are possible. Such information may be presented simultaneously, concurrently, in tandem, etc., with any particular television programming received by the receiver 340 via any particular communication channel as discussed above. It is further contemplated that the receiver 340 may also, at any particular instant or given time, output only television programming or only home automation information based on preferences or commands or selections of particular controls within an interface of or by any particular end-user. Furthermore, an end-user may be able to provide input to the receiver 340 to control the HAS 400, in its entirety as hosted by the receiver 340 or by the overlay device 428, as discussed further below.

In some examples (indicated by intermittent line in FIG. 4), the overlay device 428 may be coupled with the receiver 340 to allow or enable home automation information to be presented via the display device 430. It is contemplated that the overlay device 428 may be configured and/or arranged to overlay information, such as home automation information, onto a signal that will ultimately enable the home automation information to be visually presented via the display device 430. In this example, the receiver 340 may receive, decode, descramble, decrypt, store, and/or output television programming. The receiver 340 may output a signal, such as in the form of an HDMI signal. Rather than being directly input to the display device 430, however, the output of the receiver 340 may be input to the overlay device 428. Here, the overlay device 428 may receive video and/or audio output from the receiver 340.

The overlay device 428 may add additional information to the video and/or audio signal received from the receiver 340 so as to modify or augment or even "piggyback" on the same. That video and/or audio signal may then be output by the overlay device 428 to the display device 430 for presentation thereon. In some examples, the overlay device 428 may include or exhibit an HDMI input/output, with the HDMI output being connected to the display device 430. While FIG. 4 shows lines illustrating communication between the receiver device 340 and other various devices, it will be appreciated that such communication may exist, in addition or in alternate via the communication device 424 and/or the overlay device 428. In other words, any particular input to the receiver 340 as shown in FIG. 4 may additionally, or alternatively, be supplied as input to one or both of the communication device 424 and the overlay device 428.

As alluded to above, the receiver 340 may be used to provide home automation functionality, but the overlay device 428 may be used to modify a particular signal so that particular home automation information may be presented via the display device 430. Further, the home automation functionality as detailed throughout in relation to the receiver 340 may alternatively be provided by or via the overlay device 428. Using the overlay device 428 to present automation information via the display device 430 may be beneficial and/or advantageous in many respects. For instance, it is contemplated that multiple devices may provide input video to the overlay device 428. For instance, the receiver 340 may provide television programming to the overlay device 428, a DVD/Blu-Ray player may provide video to the overlay device 428, and a separate IPTV device may stream other programming to the overlay device 428.

Regardless of the source of particular video/audio, the overlay device 428 may output video and/or audio that has been modified or augmented, etc., to include home automation information and then output to the display device 430. As such, regardless of the source of video/audio, the overlay device 428 may modify the audio/video to include home automation information and, possibly, solicit user input. For instance, in some examples the overlay device 428 may have four video inputs (e.g., four HDMI inputs) and a single video output (e.g., an HDMI output). In other examples, the receiver 340 may exhibit such features or functionality. As such, a separate device, such as a Blu-ray player may be connected with a video input of the receiver 340, thus allowing the receiver 340 to overlay home automation information when content from the Blu-Ray player is being output to the display device 430.

Regardless of whether the receiver 340 is itself configured to provide home automation functionality and output home automation input for display via the display device 430 or such home automation functionality is provided via the overlay device 428, home automation information may be presented by the display device 430 while television programming is also being presented by display device 430. For instance, home automation information may be overlaid or may replace a portion of television programming, such as broadcast content, stored content, on-demand content, etc., presented via the display device 430. For example, while television programming is being presented, the display may be augmented with information related to home automation. In general, the television programming may represent broadcast programming, recorded content, on-demand content, or some other form of content.

An example of information related to home automation may include a security camera feed, as acquired by a camera at a front door of a residence. Such augmentation of the television programming may be performed directly by the receiver 340 (which may or may not be in communication with the communication device 424), the overlay device 428, or a combination thereof. Such augmentation may result in solid or opaque or partially transparent graphics being overlaid onto television programming (or other forms of video) output by the receiver 340 and displayed by the display device 430. Furthermore, the overlay device 428 and/or the receiver 340 may add or modify sound to television programming also or alternatively. For instance, in response to a doorbell ring, a sound may be played through the television (or connected audio system). In addition or in alternate, a graphic may be displayed. In other examples, other particular camera data (e.g., nanny camera data) and/or associated sound or motion sensors may be integrated in the system and overlaid or otherwise made available to a user. For example, detection of a crying baby from a nanny camera may trigger an on-screen alert to a user watching television.

Returning to FIG. 4 alone, the receiver 340 and/or the overlay device 428, depending on implementation-specific details, may communicate with one or more wireless devices, such as the third party device 420. The third party devices 420 may correspond to one or more user devices 360 discussed above, and represent a tablet computer, cellular phone, laptop computer, remote computer, or some other device through which a user may desire to control home automation (device) settings and view home automation information in accordance with the principles of the present disclosure. Such a device also need not necessarily be wireless, such as in a traditional desktop computer embodiment. It is contemplated that the receiver 340, communication device 424, and/or the overlay device 428 may communicate directly with the third party device 420, or may use a local wireless network, such as network 315-317 for instance. The third party device 420 may be remotely located and not connected with a same local wireless network as one or more of the other devices or elements of FIG. 4.

Various home automation devices may be in communication with an event notification module of the receiver 340 and/or the overlay device 428, depending on implementation-specific details. Such home automation devices may use similar or dissimilar communication protocols. Such home automation devices may communicate with the receiver 340 directly or via the communication device 424. Such home automation devices may be controlled by a user and/or have a status viewed by a user via the display device 430 and/or third party device 420. Examples of such home automation devices are described in the following sections. It should be understood that these examples are illustrative only and not limiting, and that other types of home automation devices may be used in other examples.

One or more cameras, such as the security camera 412 may be included in the HAS 400. It is contemplated that the security camera 412 may be installed indoors, outdoors, and may provide a video and/or an audio stream that may be presented via the third party device 420 and/or display device 430. Video and/or audio from the security camera 412 may be recorded by the overlay device 428 and/or the receiver 340 continuously, in a loop as per a predefined time period, upon an event occurring, such as motion being detected by the security camera 412, and etc. For example, video and/or audio from security camera 412 may be continuously recorded such as in the form of a rolling window, thus allowing a period of time of video/audio to be reviewed by a user from before a triggering event and after the triggering event. Video/audio may be recorded on a persistent storage device local to overlay device 428 and/or the receiver 340, and/or may be recorded and stored on an external storage devices, such as a network attached storage device or back-end server memory. In some examples, video may be transmitted across a local and/or wide area network to other one or more other storage devices upon occurrence of a trigger event, for later playback. For initial setup for example, a still may be captured by the security camera 412 and stored by the receiver 340 for subsequent presentation as part of a user interface via the display device 430. In this way, an end-user can determine which camera, if multiple cameras are present or enabled, is being set up and/or later accessed. For example, a user interface may display a still image from a front door camera, which may be easily recognized by the user because it shows a scene near or adjacent a front door of a residence, to allow a user to select the front door camera for viewing as desired.

Furthermore, video and, possibly, audio from the security camera 412 may be available live for viewing by a user via the overlay device 428 or the receiver 340. Such video may be presented simultaneously with television programming being presented. In some examples, video may only be presented if motion is detected by the security camera 412, otherwise video from the security camera 412 may not be presented by a particular display device presenting television programming. Also, such video (and, possibly, audio) from the security camera 408 may be recorded by the receiver 340 and/or the overlay device 428. In some examples, such video may be recorded based upon a user-configurable timer. For instance, features or functionality associated with the security camera 412 may be incorporated into an EPG that is output by the receiver 340 for display by a presentation or display device.

For instance, data as captured by the security camera 412 may be presented or may otherwise be accessible as a "channel" as part of the EPG along with other typical or conventional television programming channels. A user may be permitted to select that channel associated with the security camera 408 to access data as captured by the security camera 412 for presentation via the display device 430 and/or the third party device 420, etc. The user may also be permitted to set a timer to activate the security camera 408 to record video and/or audio for a user-defined period of time on a user-defined date. Such recording may not be constrained by the rolling window mentioned above associated with a triggering event being detected. Such an implementation may be beneficial, for example, if a babysitter is going to be watching a child and the parents want to later review the babysitter's behavior in their absence. In some examples, video and/audio acquired by the security camera 412 may be backed up to a remote storage device, such as cloud-based storage hosted by an external server. Other data may also be cached to the cloud, such as configuration settings. Thus, if one or both of the receiver 340 and overlay device 428 malfunction, then a new device may be installed and the configuration data loaded onto the device from the cloud.

Further, one or more window sensors and door sensors, such as the window sensor 413 and the door sensor 414 may be integrated in to or as part of the HAS 400, and each may transmit data to the receiver 340, possibly via the communication device 424, or the overlay device 428, that indicates the status of a window or door, respectively. Such status may indicate open window or door, an ajar window or door, a closed window or door, and etc. When a status change occurs, an end-user may be notified as such via the third party device 420 and/or the display device 430, within an EPG or like interface for example. Further, a user may be able to view a status screen within an EPG or other interface to view the status one or more window sensors and/or one or more door sensors throughout the location. In some examples, the window sensor 413 and/or the door sensor 414 may have integrated "break" sensors to enable a determination as to whether glass or a hinge, or other integral component, etc., has been broken or compromised. In certain embodiments, one or both of the window sensor 413 and the door sensor 414 may be controlled via interaction with particular controls as provided within or by an EPG or like interface, and information or data as acquired by one or both of the window sensor 413 and door sensor 414 may be manipulated, consolidated, etc., as desired, and also made accessible within or by an EPG or like interface, such as a pop-up window, banner, and/or other interface or display.

Further, one or more smoke and/or CO detectors, such as detector 410, may be integrated in to or as part of the HAS 400. As such, alerts as to whether a fire (e.g., heat, smoke), CO, radon, etc., has been detected can be sent to the receiver 340, third party device 420, etc., and/or one or more emergency first responders. Accordingly, when an alert occurs, a user may be notified as such the via third party device 420 or the display device 430, within an EPG or like interface for example. Further, it is contemplated that such an interface may be utilized to disable false alarms, and that one or more sensors dispersed throughout a residence and/or integrated within the HAS 400 to detect gas leaks, radon, or various other dangerous situations. In various embodiments, a detector 410 may be controlled via interaction with particular controls as provided within or by an EPG or like interface, and information or data as acquired by the detector 410 may be manipulated, consolidated, etc., as desired, and also made accessible within or by an EPG or other interface.

Further, a pet door and/or feeder, such as pet door and/or feeder 409 may be integrated in to or as part of the HAS 400. For instance, a predefined amount of food may be dispensed at predefined times to a pet. A pet door may be locked and/or unlocked. The pet's weight or presence may trigger the locking or unlocking of the pet door. For instance, a camera located at the pet door may be used to perform image recognition of the pet or a weight sensor near the door may identify the presence of the pet and unlock the door. A user may also lock/unlock a pet door and/or dispense food for example from a "remote" location. In various embodiments, a pet door and/or feeder 409 may be controlled via interaction with particular controls as provided within or by an EPG or other interface, and data received from the pet door and/or feeder 409 may be consolidated, summarized, etc., and made accessible within or by an EPG or other interface.

Further, one or more weather sensors, such as the weather sensor 415 may be integrated in to or as part of the HAS 400, and may allow or enable the receiver 340 and/or overlay device 428 to receive, identify, and/or output various forms of environmental data, including local or non-local ambient temperature, humidity, wind speed, barometric pressure, etc. In various embodiments, weather sensors 415 may be controlled via interaction with particular controls as provided within or by an EPG or other interface, and information or data received from weather sensors 415 may be manipulated, consolidated, etc., as desired, and also made accessible within or by an EPG or other.

Further, a shade controller, such as shade controller 416, may be integrated in to or as part of the HAS 400, and may allow for control of one or more shades, such as window, door, and/or skylight shades, within a home or residence or any other location. The shade controller 416 may respond to commands received from the receiver 340 and/or overlay device 428 and may provide status updates, such as "shade up" or "shade 50% up" or "shade down" and etc. In various embodiments, shade controllers 416 may be controlled via interaction with particular controls as provided within or by an EPG or other interfaces, and data received from shade controllers 416 may be manipulated, consolidated, etc., as desired, and also made accessible within or by an EPG or other interface.

Further, one or more utility monitors, such as utility monitor 418, may be integrated in to or as part of the HAS 400, and may serve to provide the receiver 340 and/or overlay device 428 with utility data or information, such as electricity usage, gas usage, water usage, wastewater usage, irrigation usage, etc. A user may via an EPG or like interface view a status page or may receive notifications upon pre-defined events occurring, such as electricity usage exceeding a defined threshold within a month, or current kilowatt usage exceeding a threshold. In various embodiments, utility monitors 418 may be controlled via interaction with particular controls as provided within or by an EPG or other interface, and data received from utility monitors 418 may be manipulated, consolidated, etc., as desired, and also made accessible within or by an EPG or other interface.

Further, one or more health sensors, such as health sensor 422, may be integrated in to or as part of the HAS 400, and may permit one or more vital characteristics of a particular individual to be acquired and/or monitored, such as a heart rate for instance. In some examples, additionally or alternatively, the health sensor 422 may contain a button or other type of actuator that a user can press to request assistance. As such, the health sensor 422 may be mounted to a fixed location, such as bedside, or may be carried by a user, such as on a lanyard. Such a request may trigger a notification to be presented to other users via the display device 430 and/or the third party device 420. Additionally or if the notification is not cleared by another user within a predefined period of time, a notification may be transmitted to emergency first responders to request help. In some examples, a home automation service provider may first try contacting the user, such as via phone, to determine if an emergency is indeed occurring. Such a health sensor 422 may have additional purposes, such as for notification of another form of emergency, such as a break-in, fire, flood, theft, disaster, etc.

In some examples, health sensor 422 may be used as a medical alert pendant that can be worn or otherwise carried by an individual. It may contain a microphone and/or speaker to allow communication with other users and/or emergency first responders. The receiver 340 and/or overlay device 428 may be preprogrammed to contact a particular phone number, such as an emergency service provider, relative, medical professional, caregiver, etc., based on an actuator of the health sensor 422 being activated by a user. The user may be placed in contact with a person via the phone number and the microphone and/or speaker of the health sensor 422. Furthermore, camera data may be combined with such alerts in order to give a contacted relative more information regarding the medical situation. For example, the health sensor 422, when activated in the family room, may generate a command which is linked with security camera footage from the same room. Furthermore, in some examples, the health sensor 422 may be able to monitor vitals of a user, such as a blood pressure, temperature, heart rate, blood sugar, etc. In some examples, an event, such as a fall or exiting a structure can be detected.

Further, in response to an alert from the health sensor 422 or some other emergency or noteworthy event, parallel notifications may be sent to multiple users at approximately the same time. As such, multiple people can be made aware of the event at approximately the same time (as opposed to serial notification). Therefore, whoever the event is most pertinent to or notices the notification first can respond. Which users are notified for which type of event may be customized by a user of the receiver 340. In addition to such parallel notifications being based on data from the health sensor 422, data from other devices may trigger such parallel notifications. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications.

Additionally, a configuring user may be able to select from a list of users to notify and method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be: 1) SMS Message; 2) push notification; 3) electronic voice recorder places call to primary number; and 4) electronic voice recorder places call to spouse's number. Other examples are possible, however, it is contemplated that the second notification may never happen if the user replies to the SMS message with an acknowledgment. Or, the second notification would automatically happen if the SMS gateway cannot be contacted. In various embodiments, health sensors 422 may be controlled via interaction with particular controls as provided within or by an EPG or other interface, and data received from the health sensors 422 may be manipulated, consolidated, etc., as desired, and also made accessible within or by an EPG or other interfaces.

Further, an intercom, such as the intercom 426, may be integrated in to or as part of the HAS 400, and may permit a user in one location to communicate with a user in another location, who may be using the third party device 420, the display device 430, or some other device, such another television receiver within the structure. The intercom 426 may be integrated with the security camera 408 or may use a dedicated microphone/speaker, such as a Bluetooth® microphone. Microphones/speakers of the third party device 420, display device 430, communication device, overlay device 428, etc., may also or alternatively be used. A MOCA network or other appropriate type of network may be used to provide audio and/or video from the intercom 426 to the receiver 340 and/or to other television receivers and/or wireless devices in communication with the PTR 210. Here, as well as in other instances of home automation related data as acquired and served to the receiver 340 and/or overlay device 428 by particular elements of FIG. 4, the intercom 426 may be controlled via interaction with particular controls as provided within or by an EPG or like interface, and information or data as acquired by the intercom 426 may be manipulated, consolidated, etc., as desired, and also made accessible within or by an EPG or like interface in accordance with the principles of the present disclosure.

Further, one or more light controllers, such as light controller 434, may be integrated in to or as part of the HAS 400, and may permit a light to be turned on, off, and/or dimmed by the receiver 340 or the overlay device 428, such as based on a user command received from the third party device 420 or directly via receiver 240 or overlay device 428, etc. The light controller 434 may control a single light. As such, multiple different light controllers 434 may be present within a house or residence. In some examples, a physical light switch, that opens and closes a circuit of the light, may be left in the "on" position such that light controller 434 can be used to control whether the light is on or off. The light controller 434 may be integrated into a light bulb or a circuit, such as between the light fixture and the power source, to control whether the light is on or off. An end-user, via the receiver 340 or overlay device 428, may be permitted to view a status of each instance of the light controller 434 within a location.

Since the receiver 340 or overlay device 428 may communicate using different home automation protocols, different instances of the light controller 434 within a location may use disparate or different communication protocols, but may all still be controlled by the receiver 340 or overlay device 428. In some examples, wireless light switches may be used that communicate with the receiver 340 or overlay device 428. Such switches may use a different communication protocol than any particular instance of the light controller 434. Such a difference may not affect functionality because the receiver 340 or overlay device 428 may serve as a hub for multiple disparate communication protocols and perform any necessary translation and/or bridging functions. For example, a tablet computer may transmit a command over a WiFi connection and the receiver 340 or overlay device 428 may translate the command into an appropriate Zigbee® or Zwave® command for a wireless light bulb. In some examples, the translation may occur for a group of disparate or different devices. For example, a user may decide to turn off all lights in a room and select a lighting command on a tablet computer, the overlay device 428 may then identify the lights in the room and output appropriate commands to all devices over different protocols, such as a Zigbee® wireless light bulb and a Zwave® table lamp.

Additionally, it is contemplated that the PTR 140 may permit timers and/or dimmer settings to be set for lights via the light controller 434. For instance, lights can be configured to turn on/off at various times during a day according to a schedule and/or events being detected by the HAS 400, etc. Here, as well as in other instances of home automation related data as acquired and served to the receiver 340 and/or overlay device 428 by particular elements of FIG. 4, each particular instance of the light controller 434 may be controlled via interaction with particular controls as provided within or by an EPG or like interface, and information or data as acquired by each particular instance of the light controller 434 may be manipulated, consolidated, etc., as desired, and also made accessible within or by an EPG or like interface in accordance with the principles of the present disclosure.

Further, a thermostat, such as the thermostat 436, may be integrated in to or as part of the HAS 400, and may provide heating/cooling updates to the receiver 340 and/or overlay device 428 for display via display device 430 and/or third party device 420. Further, control of thermostat 436 may be effectuated via the receiver 340 or overlay device 428, and zone control within a structure using multiple thermostats may also be possible. Here, as well as in other instances of home automation related data as acquired and served to the receiver 340 and/or overlay device 428 by particular elements of FIG. 4, the thermostat 436 may be controlled via interaction with particular controls as provided within or by an EPG or like interface, and information or data as acquired by the thermostat 436 may be manipulated, consolidated, etc., as desired, and also made accessible within or by an EPG or like interface in accordance with the principles of the present disclosure.

Additional appliance sensors and/or appliance controllers 438-446 also may be integrated into or included as part of the HAS 400, in order to evaluate user readiness levels for completing physical conditioning videos and/or to determine if user's have completed criteria for physical conditioning videos. In various embodiments, appliance controllers 438-446 may permit the status of the corresponding appliances to be retrieved by the receiver 340 or overlay device 428, as well as allowing commands to be sent by the receiver 240 or overlay device 428 to control operation of the appliances. Appliance controllers 438-446 may be directly integrated as part of the corresponding appliance in some cases, or may use computer software and networks, wireless communications, and the like, to connect to the corresponding appliances. Additionally or alternatively, appliance sensors and controller 438-446 may be configured to determine appliance usage data by monitoring electricity usage of one or more associated appliance (e.g., other home automation devices or circuits within a home that are monitored), or by implementing visual or audio monitoring of the appliance (e.g., using cameras 412 and microphones with video/audio analyses to detect appliance usage).

As discussed above, both personal monitoring devices associated with users, and HAS devices and systems may collect and analyze personal user data and location data in order to determine current readiness levels for users to complete certain physical conditioning videos. In FIG. 4, appliance sensors and controllers 438-446 illustrate specific examples of appliance sensors and controllers 438-446 in a HAS 400 that may be used to collect and analyze relevant data for determining a user's readiness for completing a physical conditioning video. For example, one or more electronic scale sensors 438 may be configured to record user weight measurements and times, and to transmit that data to the receiver 340 and/or overlay device 428. Additionally, one or more water dispenser controllers 440, refrigerator appliance controllers 442, and/or other kitchen appliance controllers 444 may be configured to determine a user's recent consumption of nourishment and nutrition, and this data may be transmit to the receiver 340 and/or overlay device 428. Similarly, one or more electronic medication dispenser 446 may collect and analyze data relating to the user's use of medications and may transmit this data to the receiver 340 and/or overlay device 428. Electronic medication dispensers 446 may include external appliances such as an electronic pill dispensers, insertable or embedded medical devices such as computerized intravenous (IV) drip devices, and/or other automated medication dispensing devices.

Further, one or more home security systems, such as the home security system 411, may be integrated in to or as part of the HAS 400. In general, the home security system 411 may detect motion, when a user has armed/disarmed the home security system 411, when windows/doors are opened or broken, etc. The receiver 340 may adjust settings of the home automation devices of FIG. 4 based on home security system 411 being armed or disarmed. For example, a virtual control and alarm panel may be presented to a user via the display device 430. The functions of a wall mounted panel alarm can be integrated in the graphical user interface of the TV viewing experience such as a menu system with an underlying tree hierarchical structure. It is contemplated that the virtual control and alarm panel can appear in a full screen or PiP (Picture-in-Picture) with TV content. Alarms and event notifications may be in the form of scrolling text overlays, popups, flashing icons, etc.

Additionally, camera video and/or audio, such as from the security camera 412, can be integrated with DVR content provided by the PTR 140 with additional search, zoom, time-line capabilities. The camera's video stream can be displayed full screen, PiP with TV content, or as a tiled mosaic to display multiple camera's streams at a same time. In some examples, the display can switch between camera streams at fixed intervals. The PTR 140 may perform video scaling, adjust frame rate and transcoding on video received from the security camera 412. In addition, the receiver 340 may adaptively transcode the camera content to match an Internet connection. Here, as well as in other instances of home automation related data as acquired and served to the receiver 340 and/or overlay device 428 by particular elements of FIG. 4, the home security system 411 may be controlled via interaction with particular controls as provided within or by an EPG or like interface, and information or data as acquired by the home security system 411 may be manipulated, consolidated, etc., as desired, and also made accessible within or by an EPG or like interface in accordance with the principles of the present disclosure.

Additional forms of appliance controllers and sensors not illustrated in FIG. 4 may also be incorporated as part of the HAS 400 in various embodiments. For instance, doorbell sensors and mailbox sensors, garage door sensors, and the like, may be implemented in the HAS 400 to detect and identify visitors at the user's location. The ability to control one or more showers, baths, faucets and/or external irrigation systems from the receiver 340 and/or the third party device 420 may also be provided in some embodiments. In some examples, a vehicle "dashcam" may upload or otherwise make video/audio available to the receiver 340 when within range of a particular residence. For instance, when a vehicle has been parked within range of a local wireless network with which the receiver 340 is connected, video and/or audio may be transmitted from the dashcam to the receiver 340 for storage and/or uploading to a remote server. Such systems or sensors or devices may be controlled via interaction with particular controls as provided within or by an EPG or like interface, and information or data as acquired by such systems or sensors or devices may be manipulated, consolidated, etc., as desired, and also made accessible within or by an EPG or like interface in certain embodiments.

Figure 5:
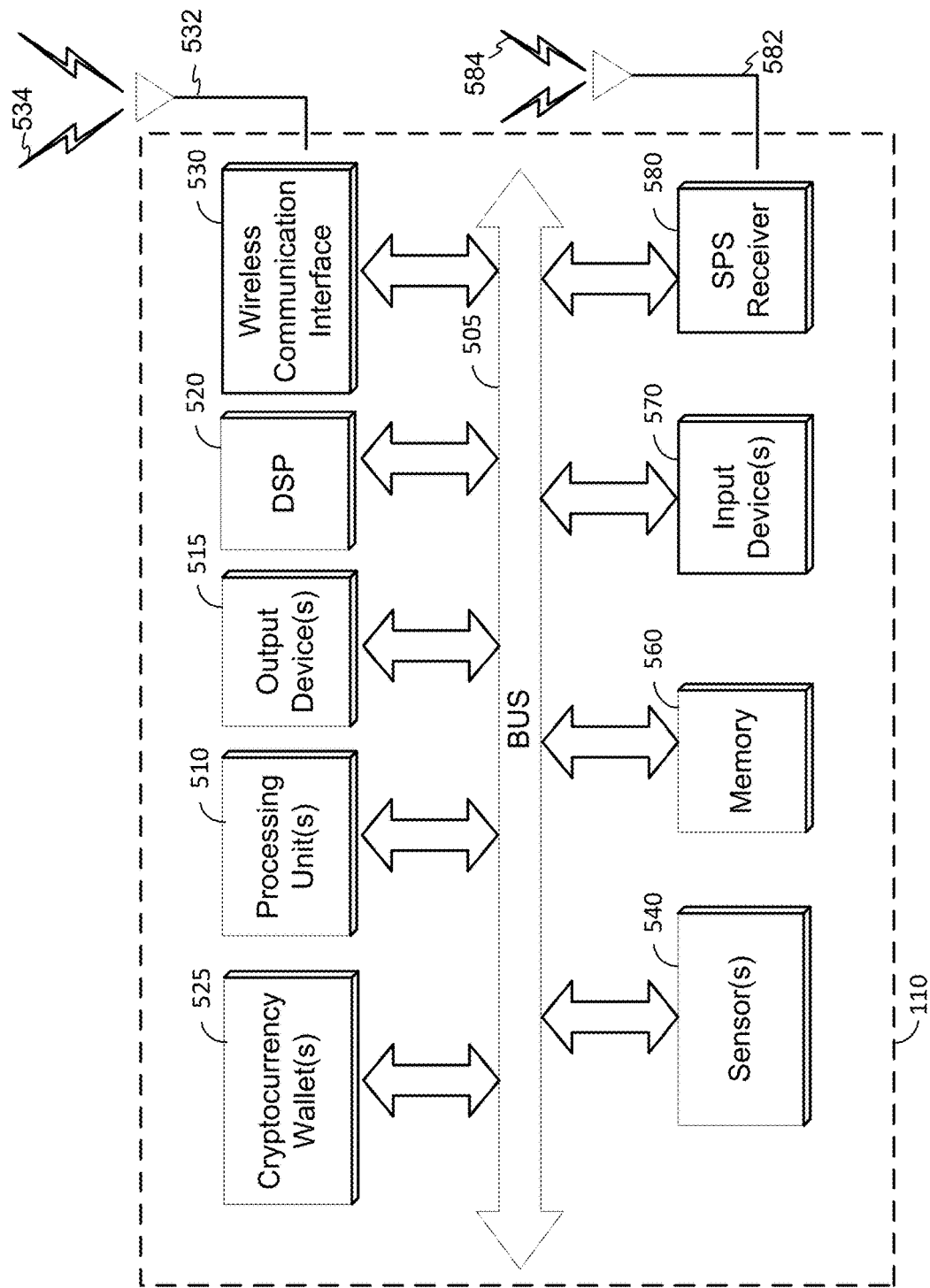
FIG. 5 is a block diagram illustrating the components of an IoT device, in accordance with one or more embodiments of the disclosure.

Referring now to FIG. 5, a block diagram is shown illustrating the component of an example IoT device 110, which may be utilized as described in the embodiments described herein. It should be noted that FIG. 5 is meant to provide only a general illustration of various components, any or all of which may be utilized as appropriate. As discussed above, IoT devices 110 may include, for example, security systems, intruder and fire alarm systems, utility meters (e.g., for gas, water, electrical, etc.), weather sensors, facility management services, vehicle-based systems, personal appliances/health monitoring devices, industrial appliances and systems (e.g., PLC devices), personal electronic appliances, person or animal tracking devices, lighting systems or speaking systems in public or commercial environments, or governmental infrastructure devices (e.g., street lamps, traffic lights, trash bins, etc.). In further examples, IoT devices 110 may include any of the devices described above within the IoT network 200 of FIG. 2, or the HAS system 400 of FIG. 4. Because IoT devices 110 may vary widely in functionality, any particular IoT device 110 may include only a subset of the components shown in FIG. 5. Additionally, in some cases, components illustrated in FIG. 5 may be localized to a single physical device and/or distributed among various networked devices, which may be disposed at different physical locations.

The IoT device 110 is shown in FIG. 5 comprising hardware elements that can be electrically coupled via a bus 505 (or may otherwise be in communication, as appropriate). The hardware elements may include a processing unit(s) 510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 5, some embodiments may have a separate DSP 520, depending on desired functionality. The IoT device 110 also may comprise one or more input devices 570, which may comprise without limitation one or more touch screens, touch pads, microphones, buttons, dials, switches, and/or the like; and one or more output devices 515, which may comprise without limitation, one or more displays, light emitting diode (LED)s, speakers, and/or the like.

The IoT device 110 may also include a wireless communication interface 530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable IoT device 110 to communicate via the networks and RATs described above with regard to FIG. 1. The wireless communication interface 530 may permit data to be communicated with a network, wireless access points, wireless base stations, other computer systems, and/or any other electronic devices described herein. The communication can be carried out via one or more wireless communication antenna(s) 532 that send and/or receive wireless signals 534.

Depending on desired functionality, the wireless communication interface 530 may comprise separate transceivers to communicate with base stations (e.g., eNBs) and other terrestrial transceivers, such as wireless devices and access points, belonging to or associated with one or more wireless networks. These wireless networks may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, NR and so on. LTE, LTE Advanced, NR, GSM, and WCDMA are described (or being described) in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The IoT device 110 may further include sensor(s) 540. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 540 can be utilized, among other things, for sensing/detecting location data (e.g., sights, sounds, smells, substances, temperatures, etc.) at the location of the IoT device 110, or for obtaining operational status of an appliance or electrical device, and/or obtaining other types of data that may be communicated to an IoT application server 135.

Embodiments of IoT device 110 may also include an SPS receiver 580 capable of receiving signals 584 from one or more SPS satellites using an SPS antenna 582, which may be combined with antenna(s) 532 in some implementations. Positioning of IoT device 110 using SPS receiver 580 may be utilized to complement and/or incorporate the techniques described herein, e.g. may be used to obtain sensor data by IoT device 110. The SPS receiver 580 may support measurement of signals from SPS SVs of an SPS system, such as a GNSS (e.g., Global Positioning System (GPS)), Galileo, GLONASS, Quasi-Zenith Satellite System (QZSS) over Japan, Indian Regional Navigational Satellite System (IRNSS) over India, Beidou over China, and/or the like. Moreover, the SPS receiver 580 may be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Additionally, the IoT device 110 may include a cryptocurrency wallet 525. Cryptocurrency wallet 525 may include one or more executable software components configured to stores private and public keys, and to interact with one or more cryptocurrency blockchains to enable the IoT device to send and receive digital currency. In some embodiments, one or more types of cryptocurrency may be preloaded onto an IoT device 110, along with predefined instructions specifying when and how much cryptocurrency the IoT device 110 may exchange to an NB-IoT network service provider in exchange for network access. Additionally or alternatively, an IoT device 110 may receive transfers of cryptocurrency from the network service provider (or other third-party system) in exchange for providing access to its sensor data. Thus, IoT devices 110 may be entirely standalone devices with respect to funding their own NB-IoT network access. In other cases, multiple related IoT devices 110 (e.g., commonly owned) may be configured to exchange cryptocurrencies with one another and/or with the primary cryptocurrency accounts of the owner.

The IoT device 110 may further include and/or be in communication with a memory 560. The memory 560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. The memory 560 may be used, among other things, to store sensor data received from sensors 540 using a database, linked list, or any other type of data structure. In some embodiments, wireless communication interface 530 may additionally or alternatively comprise memory.

The memory 560 of IoT device 110 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality for IoT device 110 discussed above might be implemented as code and/or instructions executable by IoT device 110 (and/or a processing unit within the IoT device 110). In an aspect, then, such code and/or instructions can be used to configure and/or adapt a general purpose computer (or other device) to perform one or more operations in accordance with the described methods.

Figure 6:
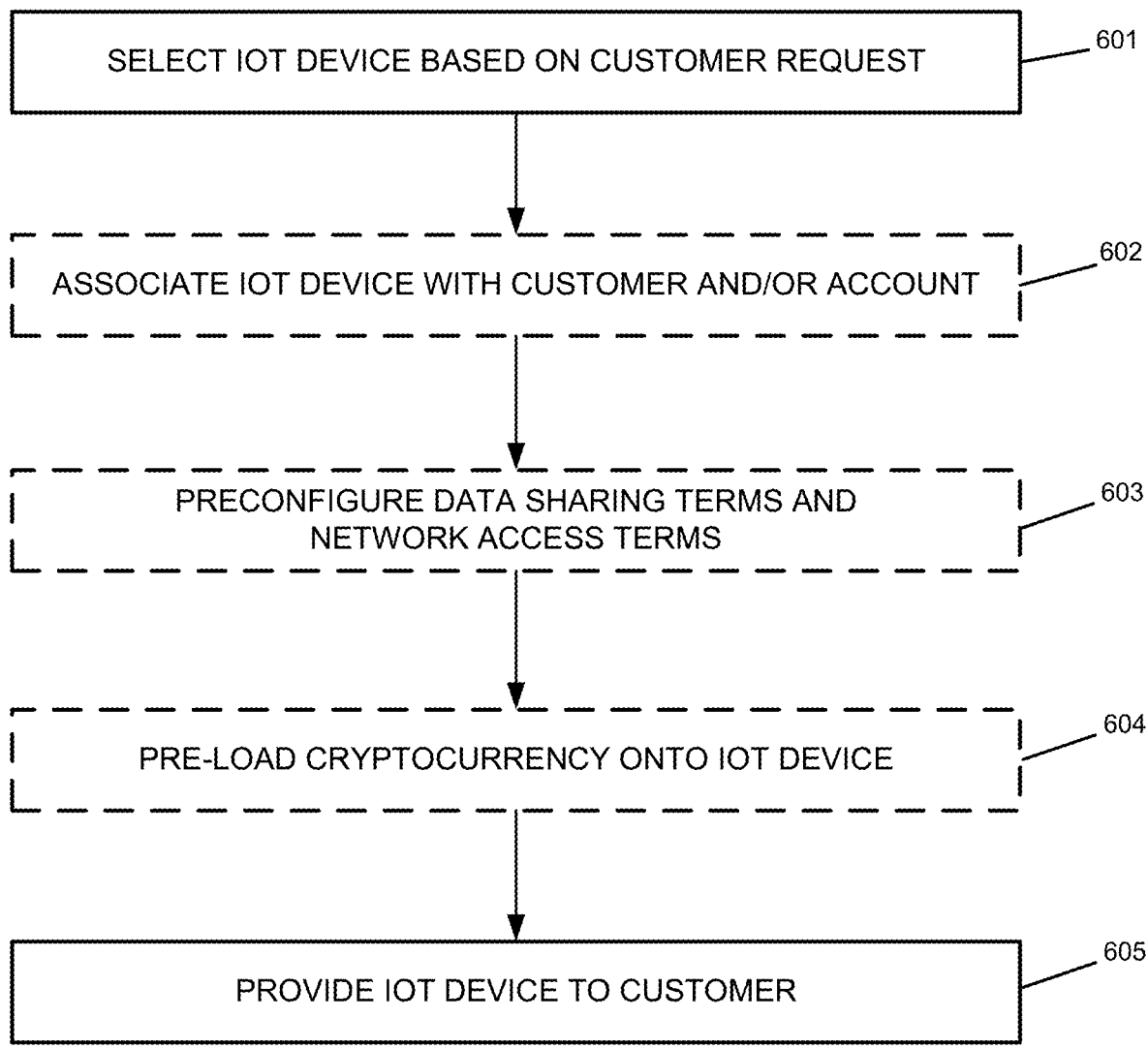
FIG. 6 is a flow diagram illustrating an example process of selecting and providing an IoT device configured to support autonomous activation within a network, in accordance with one or more embodiments of the disclosure.

Referring now to FIG. 6, a flow diagram is shown illustrating an example process of selecting and providing an IoT device 110 to a user, so that the IoT device 110 will be capable of interacting with the IoT device activation and management server 140 to autonomously request, negotiate, and obtain access to the NB-IoT network 115. As described below, the steps in this process may be performed by the IoT device activation and management server 140 and/or other related components, in response to a request from a customer for a particular IoT device 110. However, it should be understood that various other devices or combinations of systems/devices in FIGS. 1-4 may be used to perform the steps described below.

In step 601, the IoT device activation and management server 140 may receive a request for an IoT device 110 from a customer. The type of IoT device 110 requested need not be relevant for the purposes of this example, as any type of IoT device 110 may be selected, configured/provisioned, and provided to the customer to support autonomous activation and network access. Therefore, the IoT device 110 requested in step 601 may be, for example, a security system or alarm device, a utility meter device, a weather sensor device, a facility management device, a wearable health monitor device, an item or person tracking device, an industrial appliance monitor device, a governmental infrastructure device, and/or any other IoT device or electronic sensor device described herein. In some embodiments, a customer may an initiate a purchase of an IoT device 110 via a web site controlled by the IoT device activation and management server 140. Additionally or alternatively, the customer may purchase the IoT device 110 from a third-party provider, wherein the third-party provider is configured to support one or more of the purchase and configuration options in steps 602-604 below.

After the selection of the generic IoT device 110 step 601, steps 602-604 relate to customizing the generic IoT device 110 to perform autonomous activation and registration, without any customer intervention (or minimal customer intervention), once the customer receives and installs the device 110 at the desired location. In various embodiments, the generic IoT device 110 selected in step 601 may be customized simply by selecting certain device features and/or purchase options, so that the IoT device 110 is still an entirely off-the-shelf product. Additional customization might not involve directly customizing the IoT device 110, but instead recording a unique device ID of the IoT device (e.g., product number, serial number, etc.) in a database 145 with the associated user and/or other associated devices. Still other types of customization may involve directly modifying the IoT device 110, for example, by writing registration/network access data into the device memory 560, or loading a requested amount of cryptocurrency into the device's cryptocurrency wallet 525. Additionally, as indicated by the dotted lines around each of steps 602-604, these steps may be optional, so that one, two, or all three of these steps may be performed in various embodiments.

In step 602, the selected IoT device 110 may be associated with the customer that initiated the purchase of the device in step 610. As noted above, this step may be optional and need not be performed in all cases, including purchases of IoT devices 110 from third-party providers or receiving used/second-hand devices from other customers. When an IoT device 110 is associated with the customer and/or the customer's account in step 602, the association may be done by writing into the memory 560 of the device 110. Alternatively (or additionally), the IoT device activation and management server 140 may enter a record into database 145 associated a device identifier of the purchased IoT device 110 with the customer identifier (e.g, name, account number) of the customer purchasing the device. Thus, the IoT device activation and management server 140 may have records associating a particular customer with multiple different IoT devices 110.

In step 603, the selected IoT device 110 may be preconfigured with data sharing rules and/or network access rules that may be applied during the autonomous activation process after the device 110 is installed at the customer's location. The data sharing rules may refer to the terms and conditions regarding which data collected/stored by the IoT device 110 may be shared with a network service provider 115 or other third-party. For example, a customer might not be willing to share any of the IoT device's 110 data with any other entity, may be willing to share all of the data, or might only be willing to share certain subsets of the data collected and stored by the IoT device 110. Additionally, in step 603, it may be specified what amount (e.g., in dollars or cryptocurrency) the IoT device 110 should charge for sharing its data. Multiple amounts may be specified for different types of sensor data, different amounts/frequencies of data, etc. Additionally, multiple amounts may be specified corresponding to a preferred data price, a minimum data price, etc., to be used in the negotiation for NB-IoT network access.

Further, in some cases, an IoT device 110 may be configured so that it will not trade its data in exchange for use of an NB-IoT network 115; however, the IoT device 110 may be willing to trade data from another device (e.g., another IoT device 110 or HAS device 390 that is owned by the same customer), and thus the network access purchase rules configured in step 603 may include data sharing rules for other devices associated with the IoT device 110. In other examples, the IoT device 110 may be configured to indicate that it is not willing to trade its data, but that a customer purchasing the device 100 and/or a company that owns the device is willing to pay for the network activation.

Also in step 603, the configuration may include network access purchase rules, which may include the terms and conditions to be programed into the IoT device 110 for negotiating and obtaining access to the NB-IoT network 115. Thus, the network access purchase rules may indicated which types of data and how much of its data the IoT device 110 will exchange for certain levels of network access, how much cryptocurrency it will exchange for certain levels of network access, etc. As discussed above in step 602, step 603 may be performed by writing the user-selected configurations directly into the memory of the IoT device 110. Alternatively, the configurations in step 603 may be performed by the customer selecting a particular version or flavor of the IoT device 110 with the desired rules pre-programmed into the device, thus allowing the configured IoT device 110 to remain a standard off-the-shelf product. In other embodiments, the IoT device 110 may be indirectly configured, by storing the device identifier and the corresponding data sharing rules and/or network access rules into a database 145 maintained by the IoT device activation and management server 140.

In step 604, the selected IoT device 110 may optionally be loaded with a predefined amount of cryptocurrency. For example, the customer may select one or more cryptocurrency types and corresponding amounts, to have the manufacturer or provider of the IoT device 110 pre-load the requested amounts of cryptocurrency into the cryptocurrency wallet 525 of the device 110. Similar to the above configurations, step 604 may be performed by customizing a selected IoT device 110 with the precise amounts cryptocurrencies selected by the customer. Alternatively, step 604 may be performed by the customer selecting from one or more options of amounts for preloaded IoT devices 110, thus allowing the IoT device 110 preloaded with cryptocurrency to remain a standard off-the-shelf product.

Finally, in step 605, the IoT device 110 selected in step 601 and configured/customized in steps 602-604, may be provided to the customer. Providing the IoT device 110 in step 605 may include shipping the physical IoT device 110, transmitting an encrypted software image to be loaded onto a generic device 110, and the like.

Figure 7:
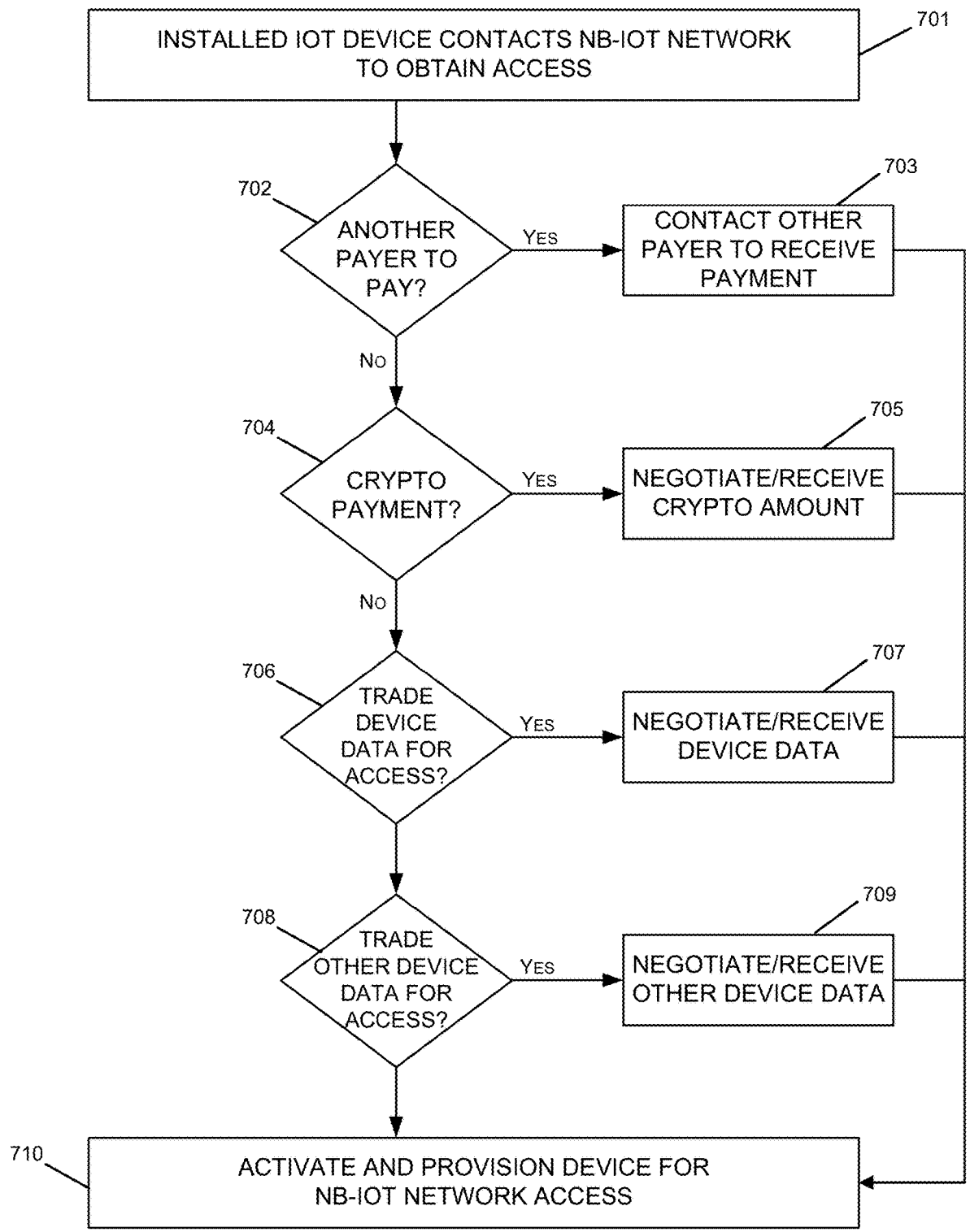
FIG. 7 is a flow diagram illustrating an example process of autonomously activating an IoT device and provisioning the IoT device to a network, in accordance with one or more embodiments of the disclosure.

Referring now to FIG. 7, a flow diagram is shown illustrating an example process of autonomously activating an IoT device 110 and provisioning the IoT device 110 to a NB-IOT network 115, following installation of the device at the customer's location. As described below, the steps in this process may be performed by IoT device 110 in conjunction with the IoT device activation and management server 140 and/or other related components. However, it should be understood that various other devices or combinations of systems/devices in FIGS. 1-4 may be used to perform the steps described below.

In step 701, an IoT device 110 is installed at a customer location (e.g., residence, vehicle, business, or any other location), in response to, the installed IoT device 110 searches for at contacts an available NB-IoT network to request access. As discussed above, although this example refers to an NB-IoT network, it should be understood that LTE networks and/or other network types configured to support IoT devices 110 may be used in other embodiments.

Additionally, IoT device 110 may initially search for compatible wireless networks and may contact multiple separate networks in step 701.

Steps 702-709 represent one possible embodiment of a negotiation between the installed IoT device 110 and the IoT device activation and management server 140, in which the parties communicate to determine one or more particular network access negotiation methods/techniques, and agree to terms by which IoT device will be activated and provisioned, and the NB-IoT network 115 may be configured to permit the IoT device 110 to access the network 115. As discussed below, these steps may be based on the customization and/or configuration of the IoT device 110 performed when the device was selected or purchased by the customer. In this example, the IoT device activation and management server 140 selects the network access negotiation methods/techniques and drives the negotiation with the IoT device 110, in the order shown in FIG. 7 (i.e., 702—Another Payer?, then 704—Cryptocurrency Payment?, then 706—Data Exchange?, and then 708—Different Device Data Exchange?). However, it should be understood that in other implementations, these selected negotiation methods and/or other factors may be prioritized differently during the negotiation process. For example, in some embodiments, trading data (step 706) may be performed first, as it may result in a portion of overall payment but not the entire payment for the network access. In such embodiments, the system may be configured to query for data trading first, determine the partial payment based on the data trading, and then potentially still query for a cryptocurrency payment to cover the rest of the network access payment. Alternatively, access may be granted with only data trading (steps 706-707), and then if there is a remaining balance it may be gathered as described in FIG. 8. Additionally, while the negotiation in this example may be driven by the IoT device activation and management server 140, in other examples the IoT device 110 may control the negotiation by querying the server 140 with specific requests for types of payments and amounts, rather than having the server 140 query the IoT device 110 as in this example. In still other examples, both parties may drive the negotiation with initiated offers, counteroffers, and the like.

In step 702, after receiving the initial network access request from the IoT device 110, the IoT device activation and management server 140 may initially inquire whether or not another payer is willing to pay for network access for the IoT device 110. In some cases, rather than the server 140 inquiring, the IoT device 110 may indicate in its initial request in step 601 that another party will pay for its network access. In still other cases, the other party willing to pay may be configured into the memory of the IoT device 110 and/or stored in a backend database 145 so that the IoT device activation and management server 140 may immediately detect that another party will make payment.

In some embodiments, the IoT device 110 may have no cryptocurrency coins/tokens, and might not be willing to trade data for network access; however, the person that owns the device may be willing to pay for the IoT device 110 to be active on the network. In this example, the IoT device 110 may be shipped with a basic contract that indicating that a third-party will pay for the network activation (and/or identifying the third-party payer). In other examples, a company or other organization that owns the IoT device 110 may be willing to pay the network activation for the customer. For example, a company (e.g., Amazon) making virtual assistant devices (e.g., Alexa) may pay for activation of the device 110 in the customer's car, in which case the device 110 may be shipped with a basic contract indication that the Amazon will pay for the network activation.

In step 703, the device owner or device user has agreed to pay for the network activation, then the IoT device activation and management server 140 may offer a smart contract to the IoT device for network access. The device 110 may be configured to ask the owner/user to establish communication with the user's mobile device, for example, by using a QR code, Bluetooth pairing, or similar method. For example, a QR code may be transmitted to the user's mobile device, and when activated the QR code may direct the user to make a payment using a standard payment method (e.g., Apple Pay, credit card, etc.) to the NB-IoT access network, using the device identifier of the IoT device. After receipt of a device confirmation and the payment, then the server 140 may provision the IoT device 110 (step 710) to activate the IoT device on the network 115. If a company owning or manufacturing the IoT device 110 has agreed to pay for the network activation, then the IoT device activation and management server 140 may again initially offer a smart contract to the IoT device with particular network access amounts, values, and/or rates for allowing network access to the IoT device. Because the server 140 knows that the company (e.g., Amazon) has agreed to pay for the smart contract to provide NB-IoT network access to the IoT device 110, the server 140 may immediately provision the IoT device 110 (step 710), then contact the trusted company for payment after activation.

In step 704, the IoT device activation and management server 140 may query the IoT device 110 to ask if it will pay for its NB-IoT network access using cryptocurrency. As discussed above in connection with FIG. 6, IoT devices 110 may be pre-loaded with various amounts of cryptocurrencies, and may be configured with rules regarding payment preferences and limits for using cryptocurrency to pay for network access. If the IoT device 110 respond that it will pay for network access using the cryptocurrency in its wallet 525, then in step 705 the parties may negotiate the cryptocurrency amount/rate and complete the transfer from the wallet software components 525 of the IoT device 110 to the server 140 (or other payment repository). After receipt of the confirmation from the IoT device 110 and/or successful completion of the cryptocurrency transfer from the IoT device 100, the server 140 may provision the IoT device 110 (step 710) to activate the IoT device on the NB-IoT network 115.

In step 706, the IoT device activation and management server 140 may query the IoT device 110 again to ask if it will pay for its access to the NB-IoT network by trading its own sensor data. As discussed above in reference FIG. 6, various IoT devices 110 may be preconfigured to exchange some or all of their data to the network provider in exchange for network access (706:Yes), while other IoT devices 110 may be configured not to share any of their data with the network provider (706:No). For instance, if the IoT device plans to encrypt its data for transmission to a separate backend server, such as an Amazon virtual assistant device Alexa 110 transmitting its data to an Amazon server, these devices 110 might not agree to share their voice data with the NB-IoT network provider.

If the IoT device 110 is willing to share some or all of its data in order to obtain network access to the NB-IoT network 115 (706:Yes), then IoT device 110 may respond to the query from the server 140 with a positive indication and a description of the data that the IoT device 110 collects. In step 707, one or both parties (i.e., the IoT device activation/management server 140, and the IoT device 110) may determine subjective values/costs for the NB-IoT network and for the data collected by the particular IoT device 110. For instance, the IoT device activation/management server 140 may determine its costs of granting the IoT device 110 access to its NB-IoT network 115, in comparison to the value of the data collected by the IoT device 110. The value of the data may be calculated based on a number of factors such as the type of data being collection, the volume of data being collected, the location of IoT device sensors, the geographic area, individuals, and/or devices within the range of the IoT device sensors. Additionally, the value of the data collected by the IoT device 110 also may be based on any substitute data (e.g., similar data from other nearby IoT devices) and/or complementary data that the IoT device activation and management server 140 has access to. Similarly, the IoT device 110 may determine its costs (if any) of sharing its data with the network provider, in comparison to the value it gains by being granted access to the NB-IoT network 115. Based on the subjective costs and values calculated by both parties, an agreement may be reached in step 707 to trade some or all of the data collected by the IoT device 110 in exchange for allowing the IoT device to use the NB-IoT network 115. If the data amount and value from the IoT device 110 exceeds the cost of the network access, then the customer/owner of the IoT device 110 may potentially make money by receiving a supplement payment (e.g., in cryptocurrency) that can be stored on the IoT device 110 (e.g., in the cryptocurrency wallet 525) and/or transferred to a separate account of the customer or device owner.

In some embodiments, both the IoT device 110 and the IoT device activation and management server 140 may periodically re-evaluate their respective value propositions of trading data for network access (or vice versa). Even after the parties have negotiated and agreed to a data-for-network-access trade in step 707, the costs and value gained to both parties may change constantly based on a number of business-related and technical factors. Thus, as discussed below, one or both parties may wish to cease or renegotiate an agreement previously made between the parties in step 707. In some embodiments, the agreements may have contract terms that effectively lock-in the parties for a period of time. In other embodiments, no length term may be set and either party may withdraw at any time.

In step 708, the IoT device activation and management server 140 may query the IoT device 110 once more to ask if it will pay for its access to the NB-IoT network 115 by trading data from another related device. As discussed above, different IoT devices 110 may be commonly owned by the same customer or business/organization, or multiple IoT devices 110 may otherwise reach an agreement to share data with one other. In such cases, if a first IoT device (110-1) has the authority to grant the NB-IoT network provider with access to the sensor data of other IoT devices (e.g., 110-2, 110-3) or other devices, then the device 110-1 may agree to do so in step 708 (708:Yes), in order to obtain access for itself to the NB-IoT network 115. The negotiation and agreement process in step 709 may be similar or identical to that described in step 707, with the exception that the first IoT device 110-1 is negotiating and agreeing to share data from a different device (e.g., IoT device 110-2) rather than its own data. In some embodiments the other device may or may not already be on the network 115. Additionally, the other device may be another IoT device (e.g., 110-2) or it may be a connected mobile phone, computing device, or an entirely separate electronic device accessible via an IoT network, cloud network, or other access network. Thus, an IoT device 110 may negotiate for and obtain NB-IoT network access in exchange for the data collected by any of (and/or any combination of) the IoT devices described in connection with FIG. 2, and/or any of the home automation system devices described in connection with FIG. 4.

In some embodiments, immediately following an autonomous activation in step 710, the server 140 may initiate another contract with the person (or legal entity) who owns and/or is using the IoT device 110. This is done to ensure proper legal use of the data, and may be done by the user entering an identification document into an application, using a QR code from the device, and/or by using a locally transmitted communication with the user's smartphone (e.g., via Bluetooth, NFC, etc.). This connection and contract with the person can also be used to exchange actual currency (i.e., US Dollars).

Figure 8:
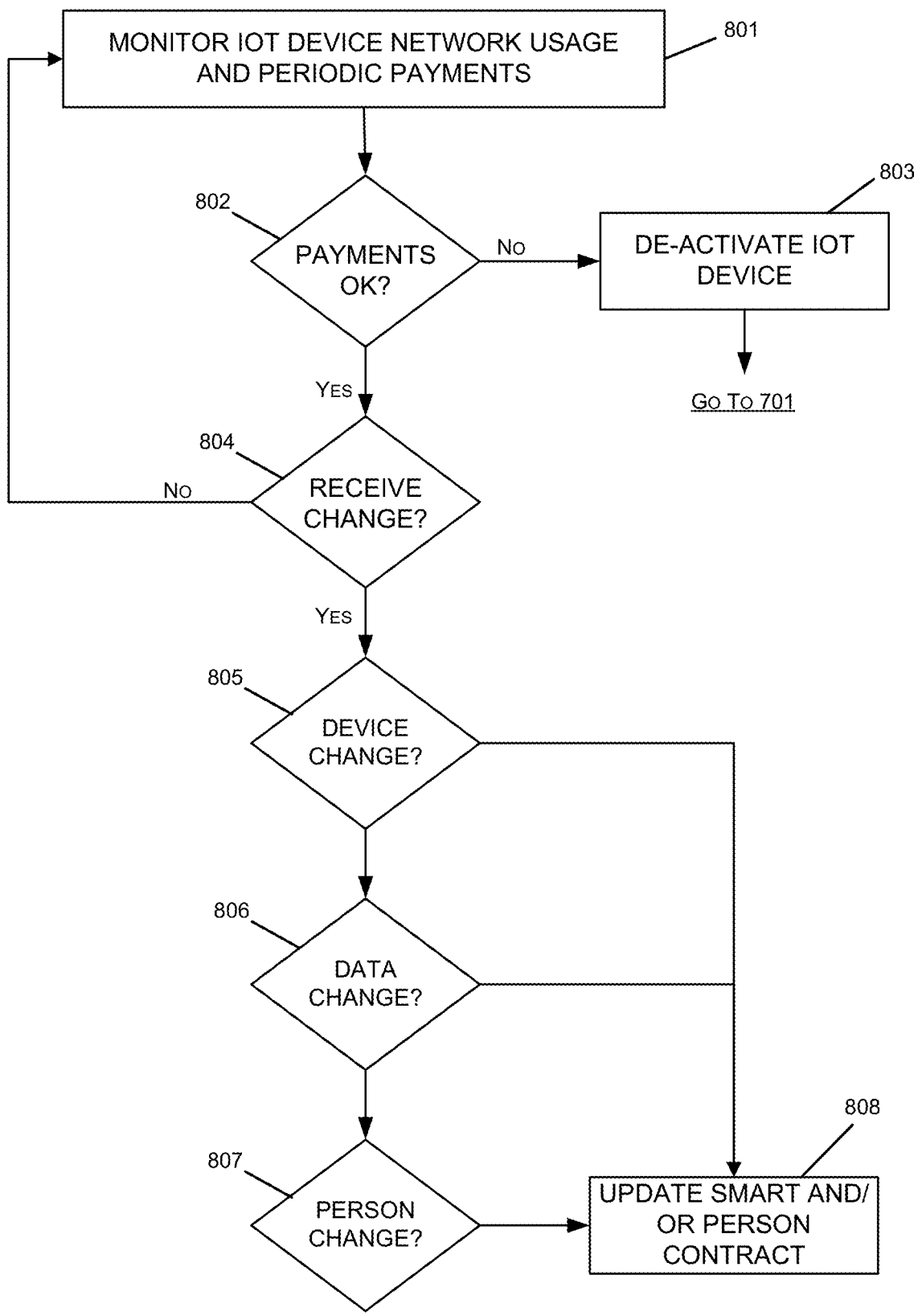
FIG. 8 is a flow diagram illustrating an example process of monitoring an active IoT device on a network, in accordance with one or more embodiments of the disclosure.

Referring now to FIG. 8, a flow diagram is shown illustrating an example process of monitoring an active IoT device 110 on a network, after previously provisioning and allowing the IoT device 110 to access the network. As with FIG. 7, the steps in this process may be performed by IoT device 110 in conjunction with the IoT device activation and management server 140 and/or other related components. However, it should be understood that various other devices or combinations of systems/devices in FIGS. 1-4 may be used to perform the steps described below.

In step 801, the usage of the NB-IoT network 115, and the recurring/periodic payments made by the IoT device 110 for access to the network 115 are monitored, and in step 802 the server 140 confirms whether both parties (i.e., the IoT device 110 and the network provider) are fulfilling the terms of their previous agreement. As discussed in detail above, the IoT device 110 may "pay" for access to the NB-IoT network 115 in several different ways. First, an individual (e.g., device owner or user) or a third-party company/organization may agree to pay for the IoT device 110 to access the network (see step 703). In this case, if the responsible person or company stops making the required payments (802:No), or notifies the server 140 that the IoT device 110 should be deactivated, then in step 803 the IoT device activation and management server 140 may deactivate the IoT device 110 and remote its network access. Second, the IoT device 110 may have agreed to pay in cryptocurrency (see step 705). In this case, if the IoT device 110 either runs out of cryptocurrency its wallet 525, or stops making payments for any other reason (802:No), then the IoT device 110 will also be deactivated in step 803. Third, the IoT device 110 may have agreed to pay by sharing its data with the network provider (see step 707). In this case, if receipt of the agreed-to data from the IoT device 110 stops (802:No), then the IoT device 110 will also be deactivated in step 803. Finally, the IoT device 110 may have agreed to pay by sharing data from one or more other devices with the network provider (see step 709). In this case, if receipt of the agreed-to data from the other devices stops (802:No), then the IoT device 110 will be deactivated in step 803.

In step 804, the IoT device activation and management server 140 may receive an indication of a change potentially affecting the previous agreement between an IoT device 110 and network provider. In some cases, the indication of a change in step 804 may be received as a notification from the IoT device 110, or from an owner or user of the device. In other cases, the server 140 may determine that a change has occurred based on the characteristics of payments or data between received, and/or based on the network usage of the IoT device 110.

As shown in this example, potential changes identified in step 804 may include one or more of: changes to the IoT device 110 (805:Yes), changes to the data being collected by the IoT device 110 (806:Yes), and/or changes to the person(s) associated with the IoT device 110 (807:Yes). To illustrate, in a first use case, a solar sensor IoT device 110 is installed on the roof a person's house. When the person sells the house, neither the IoT device 110 nor the data being collected changes, but the person associated with the IoT device does change (807:Yes). Therefore, in this use case, the smart contract made with the IoT device 110 may stay the same, but the server 140 may initiate a change to the person (or legal entity) contract made with the original homeowner in step 808. As a second use case, a camera IoT device 110 is installed in the kitchen of a home. When the homeowner sells the house, the IoT device 110 device and its location does not change, but both the person(s) associated with the IoT device 110 and the characteristics of the data being collected by the device 100 change (806:Yes; 807:Yes). Therefore, in this use case, the server 140 may initiate both a new smart contract and a new person/legal entity contract in step 808. As a third use case, a coffee cup IoT device 110 is sold from one user to another. When the new person receives and begins to use the coffee cup, both the person(s) associated with the coffee cup IoT device 110 and the characteristics of the data being collected by the coffee cup IoT device 110 change (806:Yes; 807:Yes). Therefore, in this use case, the server 140 may again initiate both a new smart contract and a new person/legal entity contract in step 808. Finally, in a fourth use case, a homeowner moves and takes his solar sensor IoT device 110 with him from his old house to his new house. In this use case, neither the IoT device 110 nor the person associated with the IoT device 110 changes, but the characteristics of the data being collected by the solar sensor IoT device 100 change (806:Yes). Therefore, in this use case, the person/legal entity contract made with the homeowner may stay the same, but the server 140 may initiate a change to the smart contract made with the solar sensor IoT device 110 in step 808.

Figure 9:
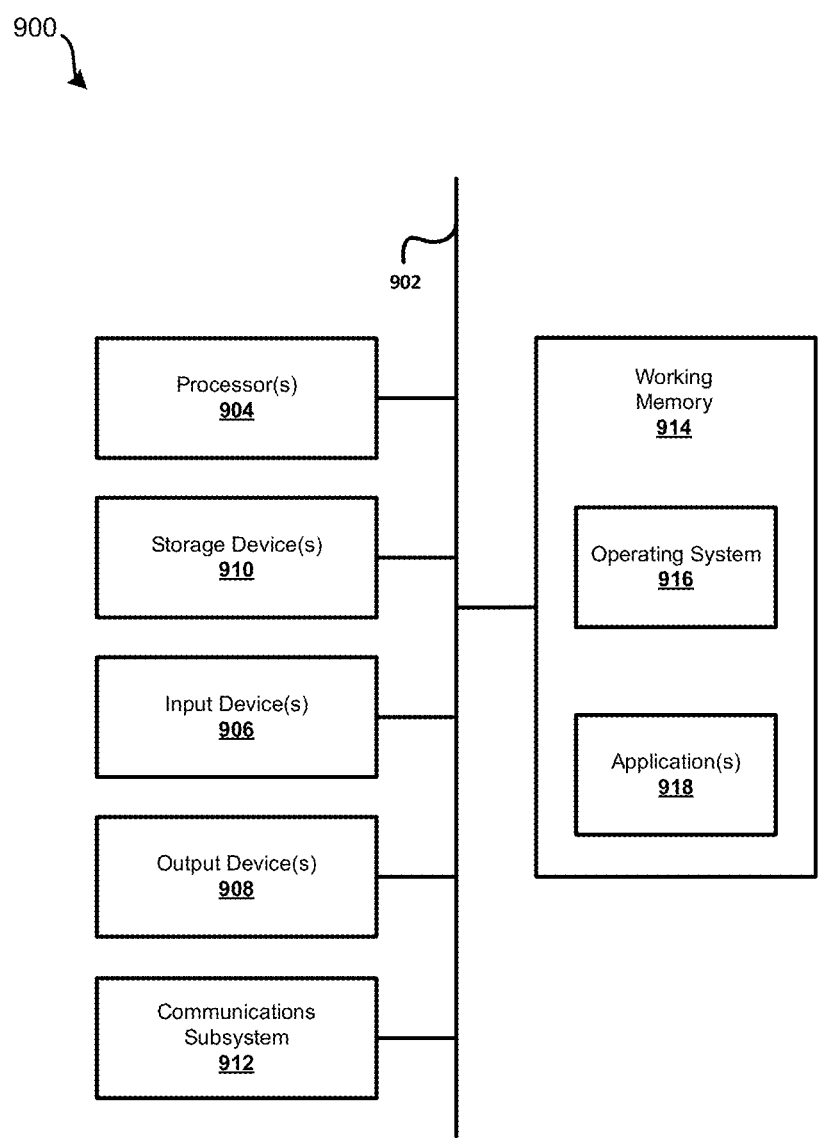
FIG. 9 is a block diagram illustrating an example computing system upon which various features of the present disclosure may be implemented.

Referring now to FIG. 9, an example is shown of a computer system or device 900 in accordance with the disclosure. Examples of computer systems or devices 900 may include systems, controllers, servers, monitors, sensors, or the like, an enterprise server, blade server, desktop computer, laptop computer, tablet computer, personal data assistant, smartphone, gaming console, set-top box, television receiver, "smart" home automation-related sensor or device or system or controller or monitor or detector, and/or any other type of machine configured for performing calculations. Any particular one of the previously-described computing devices may be wholly or at least partially configured to exhibit features similar to the computer system 900, such as any of the respective elements or components of FIGS. 1-4. In this manner, any of one or more of the respective elements of those figures may be configured and/or arranged, wholly or at least partially, for selecting and providing IoT devices configured to support autonomous activation within a network, autonomously activating IoT devices and provisioning the IoT devices to the network, and monitoring active IoT devices on a network, as discussed above. Still further, any of one or more of the respective elements of FIGS. 1-4 may be configured and/or arranged to include computer-readable instructions that, when executed, instantiate and implement various functionality described herein (e.g., one or more user output engines, devices, or services 145).

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 900 might also include a communications subsystem 912, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 912 may permit data to be exchanged with a network (such as the network described below, to name one example), other computer systems, and/or any other devices described herein. In many examples, the computer system 900 will further comprise a working memory 914, which may include a random access memory and/or a read-only memory device, as described above.

The computer device 900 also may comprise software elements, shown as being currently located within the working memory 914, including an operating system 916, device drivers, executable libraries, and/or other code, such as one or more application programs 918, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 900) to perform methods in accordance with various examples of the disclosure. According to a set of examples, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904. It should further be understood that the components of computer device 900 can be distributed across a network. For example, some processing may be performed in one location using a first processor while other processing may be performed by another processor remote from the first processor. Other components of computer system 900 may be similarly distributed. As such, computer device 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An Internet-of-Things (IoT) device activation server, comprising:
a processing unit comprising one or more processors; and
memory coupled with and readable by the processing unit and storing therein a set of computer-executable instructions which, when executed by the processing unit, causes the IoT device activation server to:
receive a request from an IoT device for initial access to a first wireless network;
determine a particular network access negotiation method for the IoT device, based on data received from the IoT device, wherein the IoT device activation server supports a plurality of network access negotiation methods by which to negotiate use of currency and/or trading of data as payment for provisioning of network access to the IoT device;
determine at least one of a network access value or network access rate for providing wireless network access to the IoT device, based on (a) the data received from the IoT device, and (b) the particular network access negotiation method determined for the IoT device;
transmit the determined at least one network access value or network access rate to the IoT device;
receive, from the IoT device, a device confirmation in response to at least one network access value or network access rate; and
in response to the device confirmation, configure the first wireless network to enable network access by the IoT device and provision the IoT device to activate the IoT device on the first wireless network.

2. The IoT device activation server of claim 1, wherein the first wireless network comprises a narrowband Internet-of-Things (NB-IoT) network.

3. The IoT device activation server of claim 1, wherein the data received from the IoT device comprises a device identifier, and wherein determining the particular network access negotiation method for the IoT device comprises:
determining, based on the received device identifier, that a third-party entity is responsible for providing network access for the IoT device.

4. The IoT device activation server of claim 1, wherein determining the particular network access negotiation method for the IoT device comprises:
receiving, from the IoT, one or more characteristics of sensor data collected by the IoT device; and
selecting, based on the characteristics of the sensor data collected by the IoT device, a sensor data for network access exchange method as the particular network access negotiation method for the IoT device, and
wherein the determined at least one network access value or network access rate comprises an amount of the sensor data collected by the IoT device.

5. The IoT device activation server of claim 4, the memory storing therein additional computer-executable instructions which, when executed by the processing unit, cause the IoT device activation server to:
provide the IoT device with ongoing access to the first wireless network, in accordance with the network access value or network access rate;
during the ongoing access to the first wireless network, by the IoT device, detect a change in the characteristics of the sensor data received by the IoT device;
in response to the change in the characteristics of the sensor data received by the IoT device, determine an updated network access value or network access rate for providing wireless network access to the IoT device;
transmit the updated network access value or network access rate to the IoT device; and
receive, from the IoT device, a device confirmation in response to the updated network access value or network access rate.

6. The IoT device activation server of claim 1, wherein determining the particular network access negotiation method for the IoT device comprises:
receiving, from the IoT, an indication that an amount of cryptocurrency is stored on the IoT device; and
determining a cryptocurrency payment method as the particular network access negotiation method for the IoT device, and
wherein the determined at least one network access value or network access rate comprises a cryptocurrency amount or rate to be provided by the IoT device in exchange for access to the first wireless network.

7. The IoT device activation server of claim 1, wherein determining the particular network access negotiation method for the IoT device comprises:
receiving, from the IoT device, at least one of an IoT device identifier or an account identifier associated with the IoT device;
determining one or more additional IoT devices associated with the IoT device, based on the at least one IoT device identifier or account identifier received from the IoT device;
retrieving, from the one or more additional IoT devices associated with the IoT device, one or more characteristics of sensor data collected by the additional IoT devices; and
selecting, based on the characteristics of the sensor data collected by the one or more additional IoT devices, a third-party sensor data for network access exchange method as the particular network access negotiation method for the IoT device.

8. A method of configuring a wireless network to enable network access by an Internet-of-Things (IoT) device, the method comprising:
receiving, by an IoT device activation server, a request from an IoT device for initial access to a first wireless network;
determining, by the IoT device activation server, a particular network access negotiation method for the IoT device, based on data received from the IoT device, wherein the IoT device activation server supports a plurality of network access negotiation methods by which to negotiate use of currency and/or trading of data as payment for provisioning of network access to the IoT device;
determining, by the IoT device activation server, at least one of a network access value or network access rate for providing wireless network access to the IoT device, based on (a) the data received from the IoT device, and (b) the particular network access negotiation method determined for the IoT device;
transmitting, by the IoT device activation server, the determined at least one network access value or network access rate to the IoT device;

receiving, by the IoT device activation server and from the IoT device, a device confirmation in response to at least one network access value or network access rate; and in response to the device confirmation: configuring, by the IoT device activation server, the first wireless network to enable network access by the IoT device; and provisioning, by the IoT device activation server, the IoT device to activate the IoT device on the first wireless network.

9. The method of configuring a wireless network to enable network access by an IoT device of claim 8, wherein the first wireless network comprises a narrowband Internet-of-Things (NB-IoT) network.

10. The method of configuring a wireless network to enable network access by an IoT device of claim 8, wherein the data received from the IoT device comprises a device identifier, and wherein determining the particular network access negotiation method for the IoT device comprises:

determining, based on the received device identifier, that a third-party entity is responsible for providing network access for the IoT device.

11. The method of configuring a wireless network to enable network access by an IoT device of claim 8, wherein determining the particular network access negotiation method for the IoT device comprises:

receiving, from the IoT, one or more characteristics of sensor data collected by the IoT device; and selecting, based on the characteristics of the sensor data collected by the IoT device, a sensor data for network access exchange method as the particular network access negotiation method for the IoT device, and wherein the determined at least one network access value or network access rate comprises an amount of the sensor data collected by the IoT device.

12. The method of configuring a wireless network to enable network access by an IoT device of claim 11, further comprising:

providing the IoT device with ongoing access to the first wireless network, in accordance with the network access value or network access rate;

during the ongoing access to the first wireless network, by the IoT device, detecting a change in the characteristics of the sensor data received by the IoT device;

in response to the change in the characteristics of the sensor data received by the IoT device, determining an updated network access value or network access rate for providing wireless network access to the IoT device;

transmitting the updated network access value or network access rate to the IoT device; and receiving, from the IoT device, a device confirmation in response to the updated network access value or network access rate.

13. The method of configuring a wireless network to enable network access by an IoT device of claim 8, wherein determining the particular network access negotiation method for the IoT device comprises:

receiving, from the IoT, an indication that an amount of cryptocurrency is stored on the IoT device; and determining a cryptocurrency payment method as the particular network access negotiation method for the IoT device, and wherein the determined at least one network access value or network access rate comprises a cryptocurrency amount or rate to be provided by the IoT device in exchange for access to the first wireless network.

14. The method of configuring a wireless network to enable network access by an IoT device of claim 8, wherein determining the particular network access negotiation method for the IoT device comprises:

receiving, from the IoT device, at least one of an IoT device identifier or an account identifier associated with the IoT device;

determining one or more additional IoT devices associated with the IoT device, based on the at least one IoT device identifier or account identifier received from the IoT device;

retrieving, from the one or more additional IoT devices associated with the IoT device, one or more characteristics of sensor data collected by the additional IoT devices; and selecting, based on the characteristics of the sensor data collected by the one or more additional IoT devices, a third-party sensor data for network access exchange method as the particular network access negotiation method for the IoT device.

15. A non-transitory computer-readable memory comprising a set of instructions stored therein which, when executed by a processing unit within a computer server, causes the processing unit to:

receive a request from an IoT device for initial access to a first wireless network;

determine a particular network access negotiation method for the IoT device, based on data received from the IoT device, wherein the computer server supports a plurality of network access negotiation methods by which to negotiate use of currency and/or trading of data as payment for provisioning of network access to the IoT device;

determine at least one of a network access value or network access rate for providing wireless network access to the IoT device, based on (a) the data received from the IoT device, and (b) the particular network access negotiation method determined for the IoT device;

transmit the determined at least one network access value or network access rate to the IoT device;

receive, from the IoT device, a device confirmation in response to at least one network access value or network access rate; and in response to the device confirmation, configure the first wireless network to enable network access by the IoT device, and provision the IoT device to activate the IoT device on the first wireless network.

16. The non-transitory computer-readable memory of claim 15, wherein the data received from the IoT device comprises a device identifier, and wherein determining the particular network access negotiation method for the IoT device comprises:

determining, based on the received device identifier, that a third-party entity is responsible for providing network access for the IoT device.

17. The non-transitory computer-readable memory of claim 15, wherein determining the particular network access negotiation method for the IoT device comprises:

receiving, from the IoT, one or more characteristics of sensor data collected by the IoT device; and selecting, based on the characteristics of the sensor data collected by the IoT device, a sensor data for network access exchange method as the particular network access negotiation method for the IoT device, and wherein the determined at least one network access value or network access rate comprises an amount of the sensor data collected by the IoT device.

18. The non-transitory computer-readable memory of claim 17, comprising additional instructions which, when executed by the processing unit, causes the processing unit to:
provide the IoT device with ongoing access to the first wireless network, in accordance with the network access value or network access rate;
during the ongoing access to the first wireless network, by the IoT device, detect a change in the characteristics of the sensor data received by the IoT device;
in response to the change in the characteristics of the sensor data received by the IoT device, determine an updated network access value or network access rate for providing wireless network access to the IoT device;
transmit the updated network access value or network access rate to the IoT device; and
receive, from the IoT device, a device confirmation in response to the updated network access value or network access rate.

19. The non-transitory computer-readable memory of claim 15, wherein determining the particular network access negotiation method for the IoT device comprises:
receiving, from the IoT, an indication that an amount of cryptocurrency is stored on the IoT device; and
determining a cryptocurrency payment method as the particular network access negotiation method for the IoT device, and
wherein the determined at least one network access value or network access rate comprises a cryptocurrency amount or rate to be provided by the IoT device in exchange for access to the first wireless network.

20. The non-transitory computer-readable memory of claim 15, wherein determining the particular network access negotiation method for the IoT device comprises:
receiving, from the IoT device, at least one of an IoT device identifier or an account identifier associated with the IoT device;
determining one or more additional IoT devices associated with the IoT device, based on the at least one IoT device identifier or account identifier received from the IoT device;
retrieving, from the one or more additional IoT devices associated with the IoT device, one or more characteristics of sensor data collected by the additional IoT devices; and
selecting, based on the characteristics of the sensor data collected by the one or more additional IoT devices, a third-party sensor data for network access exchange method as the particular network access negotiation method for the IoT device.

\* \* \* \* \*